US012427405B2

(12) United States Patent
Ironmonger et al.

(10) Patent No.: US 12,427,405 B2
(45) Date of Patent: Sep. 30, 2025

(54) INPUT APPARATUS FOR A GAMES CONSOLE

(71) Applicant: Ironburg Inventions Limited, Wincanton (GB)

(72) Inventors: Duncan Ironmonger, Milton, GA (US); Carl Jeffrey, Cheltenham (GB); Sunil Daddar, Suwanee, GA (US); Matthew Hooper, Westbury Park (GB)

(*) Notice: Subject to any disclaimer, the term of this patent is extended or adjusted under 35 U.S.C. 154(b) by 286 days.

(21) Appl. No.: 18/255,176

(22) PCT Filed: Nov. 29, 2021

(86) PCT No.: PCT/GB2021/053099
§ 371 (c)(1),
(2) Date: May 31, 2023

(87) PCT Pub. No.: WO2022/118000
PCT Pub. Date: Jun. 9, 2022

(65) Prior Publication Data
US 2024/0001224 A1 Jan. 4, 2024

Related U.S. Application Data

(60) Provisional application No. 63/119,725, filed on Dec. 1, 2020.

(51) Int. Cl.
*A63F 13/24* (2014.01)
(52) U.S. Cl.
CPC ..................... *A63F 13/24* (2014.09)
(58) Field of Classification Search
CPC ....................................................... A63F 13/24
USPC ........................................................ 463/37
See application file for complete search history.

(56) References Cited

U.S. PATENT DOCUMENTS

| 10,272,344 | B2* | 4/2019 | Kelly | G06F 21/32 |
|---|---|---|---|---|
| 2017/0319966 | A1* | 11/2017 | Kelly | A63F 13/79 |
| 2018/0325774 | A1* | 11/2018 | Gitman | F16B 37/16 |
| 2019/0176033 | A1 | 6/2019 | Ironmonger et al. | |
| 2019/0247278 | A1* | 8/2019 | Gitman | A61J 1/2055 |
| 2023/0401274 | A1* | 12/2023 | Denninghoff | G06Q 30/0251 |
| 2024/0298952 | A1* | 9/2024 | Al-Ali | A61B 5/02233 |

FOREIGN PATENT DOCUMENTS

| EP | 3 595 788 | 1/2020 |
|---|---|---|
| WO | WO 2018/229466 | 12/2018 |

OTHER PUBLICATIONS

International Searching Authority: International Search Report and Written Opinion, App. No. PCT/GB2021/053099 (Feb. 18, 2022).

* cited by examiner

*Primary Examiner* — Pierre E Elisca
(74) *Attorney, Agent, or Firm* — Walters & Wasylyna LLC

(57) ABSTRACT

The invention provides an improved controller (110) for a games console. The invention is a games controller (110) that is intended to be held by a user in both hands in the same manner as a conventional controller (1). The controller of the invention (110) may comprise a plurality of controls (101, 102, 103, 104, 105, 106, 107A, 107B, 107C, 108, 109) on the front and top of the controller (110). The controller of the present invention (10) is advantageous as it additionally comprises at least one additional control (120, 122) located on the side walls of the controller (110) in a position to be operated by the index fingers of a user (12).

19 Claims, 13 Drawing Sheets

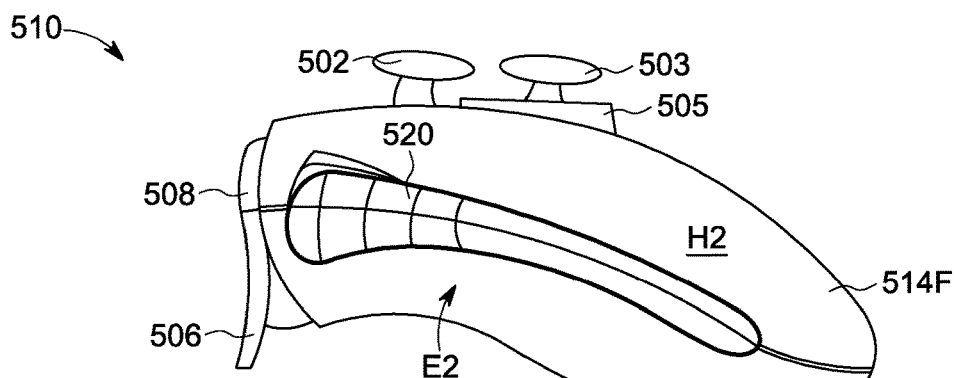
FIG. 5A
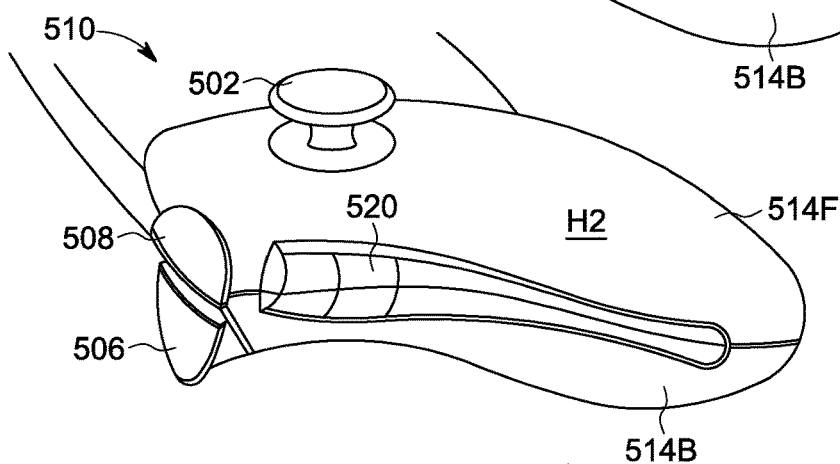
FIG. 5B
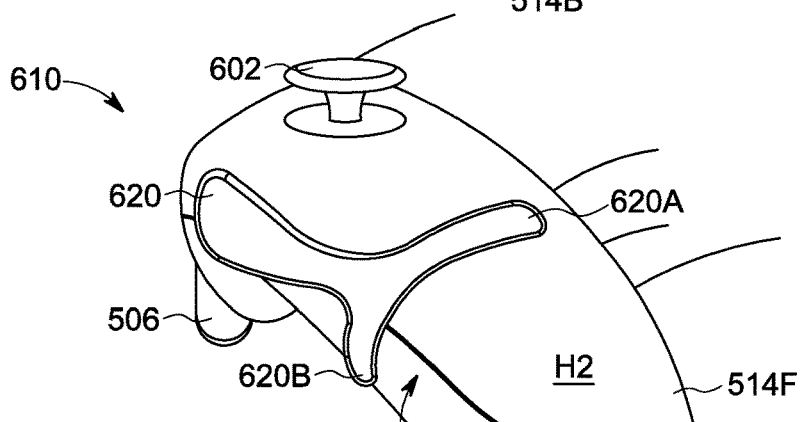
FIG. 5C
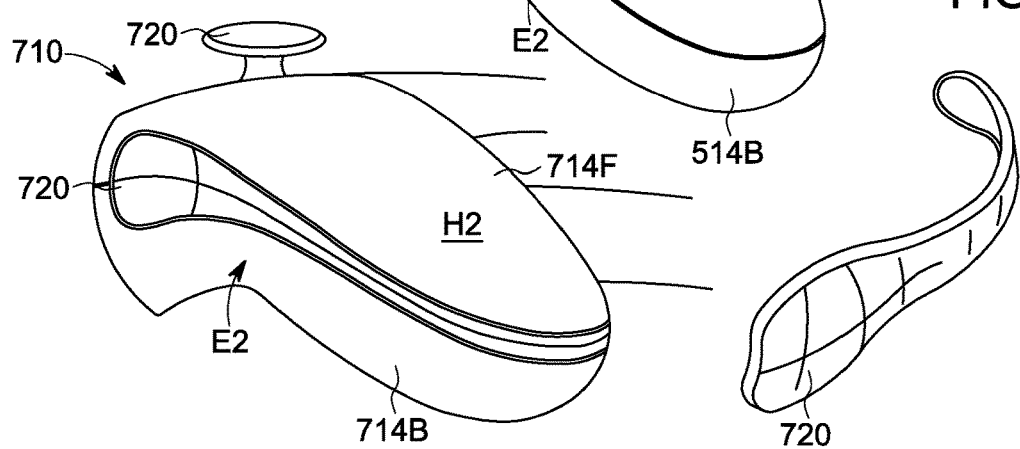
FIG. 5D
FIG. 5E

INPUT APPARATUS FOR A GAMES CONSOLE

This application is the U.S. national phase entry of Intl. App. No. PCT/GB2021/053099 filed on Nov. 29, 2021, which claims priority from U.S. Ser. No. 63/119,725 filed on Dec. 1, 2020. The entire contents of Intl. App. No. PCT/GB2021/053099 and U.S. Ser. No. 63/119,725 are incorporated herein by reference.

FIELD

The present invention relates to an input apparatus for a computer, such as, but not limited to, a games console, more particularly, but not exclusively the invention relates to, a hand-held controller for a games console.

BACKGROUND

Controllers for most current game consoles are generally intended to be held and operated by the user holding the controller in both hands, such controllers are sometimes referred to as "gamepads". A conventional controller will generally comprise a hard outer case with a plurality of controls mounted about the controller. Typically, the controls include buttons, analogue control sticks, bumpers and triggers and are provided upon the front or the top of the controller.

An object of the present invention is to provide a controller having at least one additional control mounted to the controller. It is desirable that the controller is ergonomic, that a user can comfortably operate the control. It is also desirable that the additional control is readily accessible.

The present invention seeks to overcome or at least mitigate the problems of the prior art.

SUMMARY

A first aspect of the present disclosure provides an input apparatus for a computer comprising an outer case having a front face, a top face and opposing side walls, the apparatus comprising at least one control located on the top face of the apparatus, the apparatus being shaped to be held in both hands of a user such and the user's index fingers are positioned to operate the at least one control located on the top of the apparatus; the apparatus further comprises at least one additional control located on at least one of the opposing side walls of the apparatus in a position operable by an intermediate portion of the user's index finger.

Optionally, at least one additional control comprises a switch mechanism disposed in an interior of the outer case.

Optionally, at least one additional control comprises an actuator pivotally mounted in cradle disposed within the interior of the outer case.

Optionally, at least one additional control comprises a trunnion mounted in the cradle, the cradle comprising a first portion provided by a portion of the outer case and a second portion provided by a chassis member.

Optionally, at least one additional control comprises at least one limb coupling the trunnion to a body portion.

Optionally, the body portion extends through an opening in the outer case.

Optionally, a cover is mounted to the body portion and wherein at least a portion of the cover extends through the opening in the outer case.

Optionally, at least one additional control comprises a sensor mounted to said one of the opposing side walls of the apparatus.

Optionally, the at least one additional control is disposed proximate the at least one control located on the top of the apparatus.

Optionally, the input apparatus is a hand-held controller for a games console and further comprises:
  a plurality of controls located on a front face and top face of the controller;
  the controller being shaped to be held in both hands of a user such that the user's thumbs are positioned to operate controls located on the front of the controller and the user's index fingers are positioned to operate controls located on the top of the controller.

Optionally, the at least one additional control is integral with a panel forming the outer case of the apparatus.

Optionally, a grip element is mounted to at least a portion of the at least one additional control. The grip element may be detachably mounted to the at least one additional control. The grip element may comprise a first part of a securing mechanism for engaging with a second part of a securing mechanism provided by the input apparatus Optionally, the at least one additional control is defined in part by a cutaway in the panel.

Optionally, the at least one additional control comprises a living hinge coupling the at least one additional control to the outer case.

Optionally, a second panel forming part of the outer case comprises a cutaway in which at least a portion of the at least one additional control is received.

A second aspect of the present disclosure provides an input apparatus for a computer comprising an outer case having a front face, a top face and opposing side walls, the apparatus comprising at least one control located on the top face of the apparatus, the apparatus being shaped to be held in both hands of a user such and the user's index fingers are positioned to operate the at least one control located on the top of the apparatus; the apparatus further comprises at least one additional control located on at least one of the opposing side walls of the apparatus, the at least one additional control being disposed proximate at least one control located on the top of the apparatus.

A third aspect of the present disclosure provides a hand held controller for video games console comprising an outer case having a front face, a top face and opposing side walls, the apparatus comprising at least one control located on the top face of the controller, the controller being shaped to be held in both hands of a user such and the user's index fingers are positioned to operate the at least one control located on the top of the controller; the controller further comprises at least one additional control located on at least one of the opposing side walls of the controller, the at least one additional control being disposed proximate at least one control located on the top of the controller.

A fourth aspect of the present disclosure provides an input apparatus for a computer comprising an outer case having a front face, a top face and opposing side walls, the apparatus comprising at least one control located on the top face of the apparatus and at least one control located on the front face of the apparatus, the apparatus being shaped to be held in both hands of a user such and the user's index fingers are positioned to operate the at least one control located on the top of the apparatus and the user thumbs are positioned to operate the at least one control located on the front face of the apparatus; the apparatus further comprises at least one additional control located on at least one of the opposing side walls of the apparatus, a portion of the at least one additional control being mounted in a position between an intermediate portion of the user's index finger and the outer case of the apparatus.

Optionally, at least one additional control comprises at least one switch mechanism disposed in an interior chamber defined by the outer case.

Optionally, at least one additional control comprises a contoured member extending about the side wall of the outer case.

Optionally, at least one additional control comprises a contoured member extending about the side wall and at least one of the top, bottom or rear end of the apparatus.

Optionally, at least one additional control is removable.

Optionally, at least one additional control is mounted to a mounting base located in a position between an intermediate portion of the user's index finger and the outer case of the apparatus.

Optionally, at least one additional control comprises a body portion wherein the body portion extends through an opening in the outer case.

Optionally, at least one additional control comprises at least two switch mechanisms disposed in an interior of the outer case.

Optionally, at least one additional control is pivotally mounted to the apparatus.

Optionally, at least one additional control takes the form of a rocker switch.

Optionally, at least one additional control takes the form of a toggle switch.

Optionally, at least one additional control takes the form of a rotary switch.

A fifth aspect of the present disclosure provides an input apparatus for a computer comprising an outer case having a front face, a top face and opposing side walls, the apparatus comprising at least one control located on the top face of the apparatus, the apparatus being shaped to be held in both hands of a user such and the user's index fingers are positioned to operate the at least one control located on the top of the apparatus; the apparatus further comprises at least one additional control mounted on at least one of the opposing side walls of the apparatus and extending over a handle of the apparatus.

A sixth aspect of the present disclosure provides an input apparatus for a computer comprising an outer case having a front face, a back face opposing the front face, a top face and opposing side walls, the apparatus comprising at least one control located on the top face of the apparatus, the apparatus being shaped to be held in both hands of a user such and the user's index fingers are positioned to operate the at least one control located on the top of the apparatus; the apparatus further comprises at least one additional control located on the back of the apparatus in a position to be operated by the grip finger of a user, wherein the at least one additional control is integral with a first panel or surface forming the outer case of the apparatus.

Optionally, the at least one additional control is defined in part by a cutaway in the first panel.

Optionally, the at least one additional control comprises a living hinge coupling the at least one additional control to the outer case.

Optionally, the input apparatus further comprises at least one second additional control located on the back of the apparatus and provided in a second panel or surface of the outer case, the second panel or surface being oriented at an angle to the first panel.

Optionally, the second panel or surface is disposed adjacent to the first panel or surface.

Optionally, the second panel and the first panel define an internal corner.

Optionally, the input apparatus further comprises a locking device for disabling the at least one additional control.

Optionally, the locking device comprises a rotatable cam, moveable between a first, disabling, position proximate an inner surface of the at least one additional control and a second, enabling, position, the at least one additional control being displaceable when the locking device is in the second position wherein displacement of the at least one additional control is inhibited when the locking device is in the first position.

Optionally, the at least one additional control comprises a control member having at least one living hinge about which the control member is displaceable.

Optionally, the at least one additional control comprises a control member and two or more sensors activatable by the control member, the control member having at least one living hinge about which the control member is displaceable to activate at least one of the two or more sensors.

Optionally, the control member comprises a juncture coupling the control member to the first panel.

Optionally, the juncture is defined at least in part a cutaway in the first panel.

Optionally, the apparatus comprises at least one second additional control disposed adjacent to at least one first additional control. The at least one first additional control may be integral with the first panel. The at least one second additional control may comprise a discrete body component extending through an opening in the outer case of the apparatus.

Optionally, the opening is integral with a cutaway in the first panel defining at least in part the at least one first additional control.

Optionally, the opening is unitary with a cutaway in the first panel defining at least in part the at least one first additional control.

Optionally, the opening defines in part a juncture between the outer case of the apparatus and a control member forming part of the at least one first additional control.

Optionally, the control member comprises an engagement region standing proud of the outer case adjacent thereto.

Optionally, the apparatus comprises at least one second additional control disposed adjacent to at least one first additional control, the at least one second additional control being arranged in opposition to the at least one first additional control.

Optionally, the at least one second additional control is provided in a medial region of the apparatus disposed between a pair of handles and the at least one first additional control is provided in a side wall of one of the pair of handles.

Optionally, the apparatus comprises at least one second additional control disposed proximate to at least one first additional control. The at least one second additional control may be arranged in opposition to the at least one first additional control.

A seventh aspect of the present disclosure provides an input apparatus for a computer comprising an outer case having a front face, a top face and opposing side walls, the apparatus comprising at least one control located on the top face of the apparatus, the apparatus being shaped to be held in both hands of a user such and the user's index fingers are positioned to operate the at least one control located on the top of the apparatus; the apparatus further comprises at least one additional control located on at least one of the opposing side walls of the apparatus in a position operable by the user's index finger, wherein the at least one additional control is integral with a panel forming the outer case of the apparatus.

Optionally, the at least one additional control is defined in part by a cutaway in the panel.

Optionally, the at least one additional control comprises a living hinge coupling the at least one additional control to the outer case.

Optionally, a second panel forming part of the outer case comprises a cutaway in which at least a portion of the at least one additional control is received.

Within the scope of this application, it is envisaged or intended that the various aspects, embodiments, examples, features and alternatives set out in the preceding paragraphs, in the claims and/or in the following description and drawings may be considered or taken independently or in any combination thereof.

Features or elements described in connection with, or relation to, one embodiment are applicable to all embodiments unless there is an incompatibility of features. One or more features or elements from one embodiment may be incorporated into, or combined with, any of the other embodiments disclosed herein, said features or elements extracted from said one embodiment may be included in addition to, or in replacement of one or more features or elements of said other embodiment.

A feature, or combination of features, of an embodiment disclosed herein may be extracted in isolation from other features of that embodiment. Alternatively, a feature, or combination of features, of an embodiment may be omitted from that embodiment.

Further features and advantages of the present invention will be apparent from the specific embodiments illustrated in the drawings and discussed below.

BRIEF DESCRIPTION OF THE DRAWINGS

Exemplary embodiments of the invention will now be described with reference to the accompanying drawings, in which:

FIGS. 5A to 5E are schematic illustrations of an input apparatus for a games console controller according to still further alternative embodiments of the present disclosure;

DETAILED DESCRIPTION

Figure 1A:
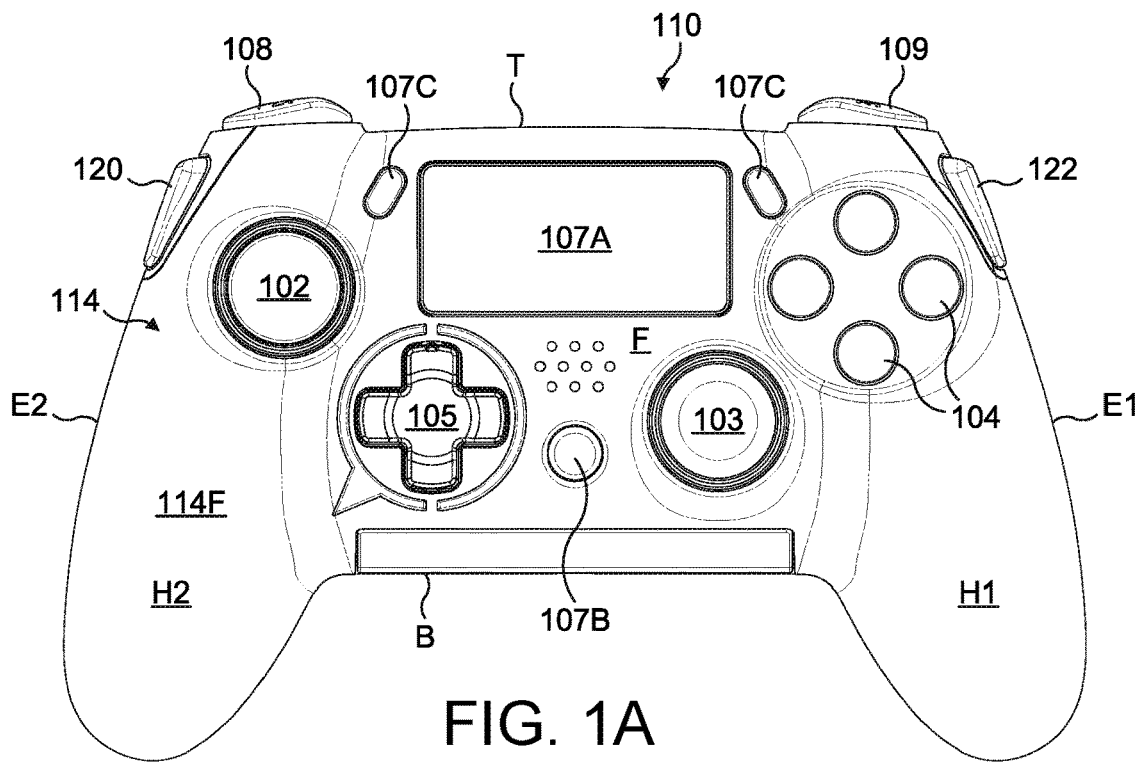
FIG. 1A is a schematic illustration of the front of an input apparatus for a games console controller according to an embodiment of the present disclosure.

Detailed descriptions of specific embodiments of an input apparatus, a controller, an additional control component and a method are disclosed herein. It will be understood that the disclosed embodiments are merely examples of the way in which certain aspects of the invention can be implemented and do not represent an exhaustive list of all of the ways the invention may be embodied. As used herein, the word "exemplary" is used expansively to refer to embodiments that serve as illustrations, specimens, models, or patterns. Indeed, it will be understood that the input apparatus, the controller, the additional control component and the method described herein may be embodied in various and alternative forms. The Figures are not necessarily to scale and some features may be exaggerated or minimized to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention Referring to FIG. 1A there is shown a plan view from above of the front of an input apparatus 110 for a use with a computer. The input apparatus 110 illustrated takes the form of a controller 110 or game pad 110 for use with a video games console, personal computer, laptop computer or similar. In other embodiments the input apparatus 110 may take the form of a handheld games console or other mobile device such as but not limited to a smartphone, tablet computer, phablet or the input apparatus 110 may be an accessory device (such as, but not limited to, a sleeve or case) for use with such a mobile device.

Figure 1B:
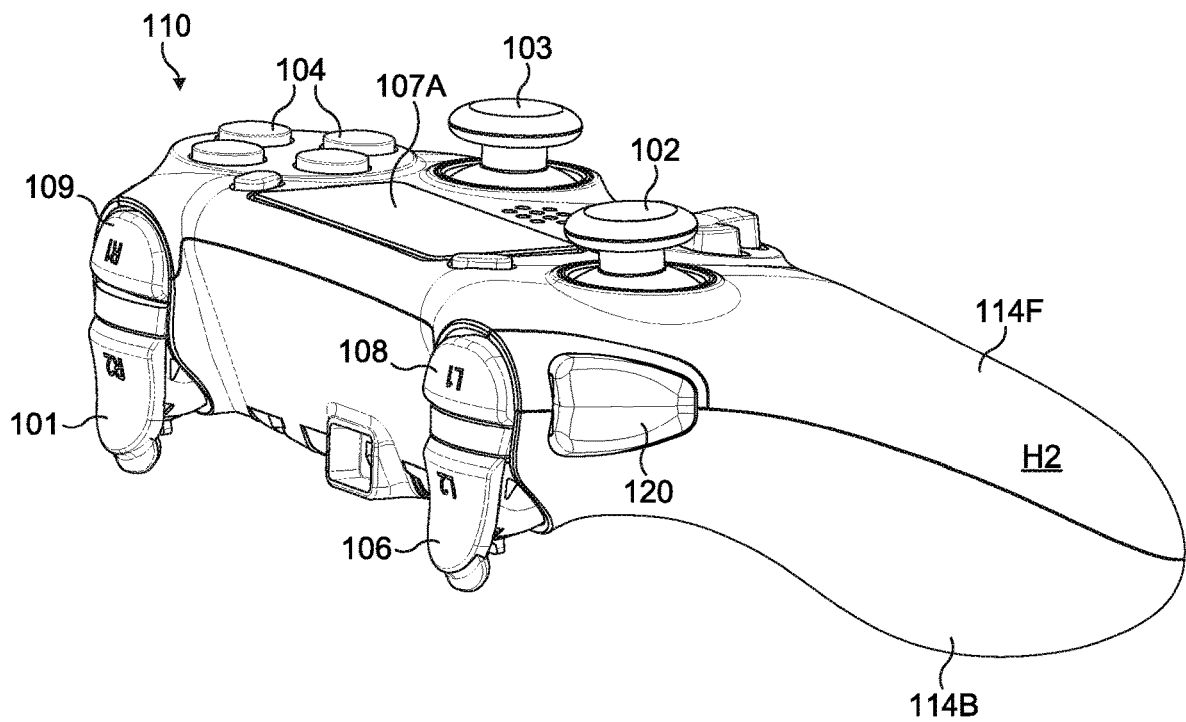
FIG. 1B is a perspective view from above of the input apparatus of FIG. 1A.

The apparatus or controller 110 comprises an outer case or shell 114. The case 114 may comprise one or more panels fitted together and or mounted to a chassis member. The case 114 may comprise a front body panel 114F and a rear body panel 114B (see FIG. 1B). The outer case 114 comprises a void in which electronic components (such as, but not limited to, switches 138 and/or sensors) are located. FIGS. 2A to 2D show alternative views of the controller 110.

The apparatus or controller 110 comprises a plurality of controls which are mounted to the front F and to the top T of the controller 110. As used herein the term "front" refers to an upper surface of the controller 110 when in normal use held in both hands, whilst the term "top" refers to a leading edge of the controller 110 which typically faces away from a user when held in both hands. A rear or back of the controller opposes the "front" and typically will form a lower surface, whilst the term "bottom" B refers to a trailing edge of the controller 110 which typically faces towards the user when held in both hands. The controller 110 comprises a plurality of buttons which when activated initiate a specific action or control function. The controller 110 comprises at least one omnidirectional control stick or button which is operable to provide directional input.

Specifically, in the illustrated example shown, the controller 110 comprises first, left, and second, right, analogue control sticks, also known as thumb sticks 102, 103. The first left 102 and second right 103 thumb sticks normally control movement and are intended to be operated by the user's left and right thumbs respectively. Left and right thumb sticks 102, 103 are mounted to the front face F of the controller 110. The left thumb stick 102 is located in a forward (or upper i.e., nearer the top T of the controller 110) left region of the front face F; and right thumb stick 103 is located in a rearward (or lower i.e., nearer the bottom B of the controller 110) right region of the front face F. There are four buttons 104, located on a forward (or upper i.e., nearer the top T of the controller 110) right portion of the front face F of the controller 110. The four buttons 104 normally control additional actions and are intended to be operated by the user's right thumb. There is a direction pad 105 located on the rearward (or lower) left portion of the front face F of the controller 110. The direction pad 105 is intended to be operated by the user's left thumb, typically either as an alternative to the left thumb stick 102 or to provide additional action controls. A left shoulder button or bumper 108 and a right shoulder button or bumper 109 are located on the top face T of the controller 110. A left trigger 106 and a right trigger 101 are also located on the top face T of the controller 10 (see FIG. 1B). The left and right triggers 106, 101 are typically operated by a user's index fingers. The left and right bumpers 8, 9 may also be operated by a user's index fingers. The left and right triggers 106, 101 may be analogue in nature, or may comprise a plurality of discrete digital states, that is to say the input control may be dependent upon the degree of depression or displacement of the trigger body.

The controller 110 may comprise one or more additional input buttons 107A, 107B, 107C, the buttons 107A, 107B, 107C may take the form of one or more digital or analogue buttons, or may be in the form of a touch pad or touch screen.

In order to operate any of the buttons 104 a user will normally remove their right thumb from the right thumb stick 103 so as to depress one or more of the buttons 104. Switching between the right thumb stick 103 and the buttons 104 takes time since the user's thumb must traverse the distance therebetween. This may also cause a loss of, or reduction in, control in some games because the user has to relinquish control over the right thumb stick 103 in order to control the buttons 104. This may be a particular problem in games where the right thumb stick 103 is used for aiming. A similar problem may arise in games where the direction pad 105 provides additional actions and the user has to remove their left thumb from the left thumb stick 102 in order to operate the direction pad 105.

The controller 110 may comprise one or more additional controls (not shown) mounted to the rear or back of the apparatus 110, where the rear or back face is opposite the top face F (the face F to which the buttons 104, left and right thumb sticks 102, 103 and direction pad 105 are mounted).

Figure 1C:
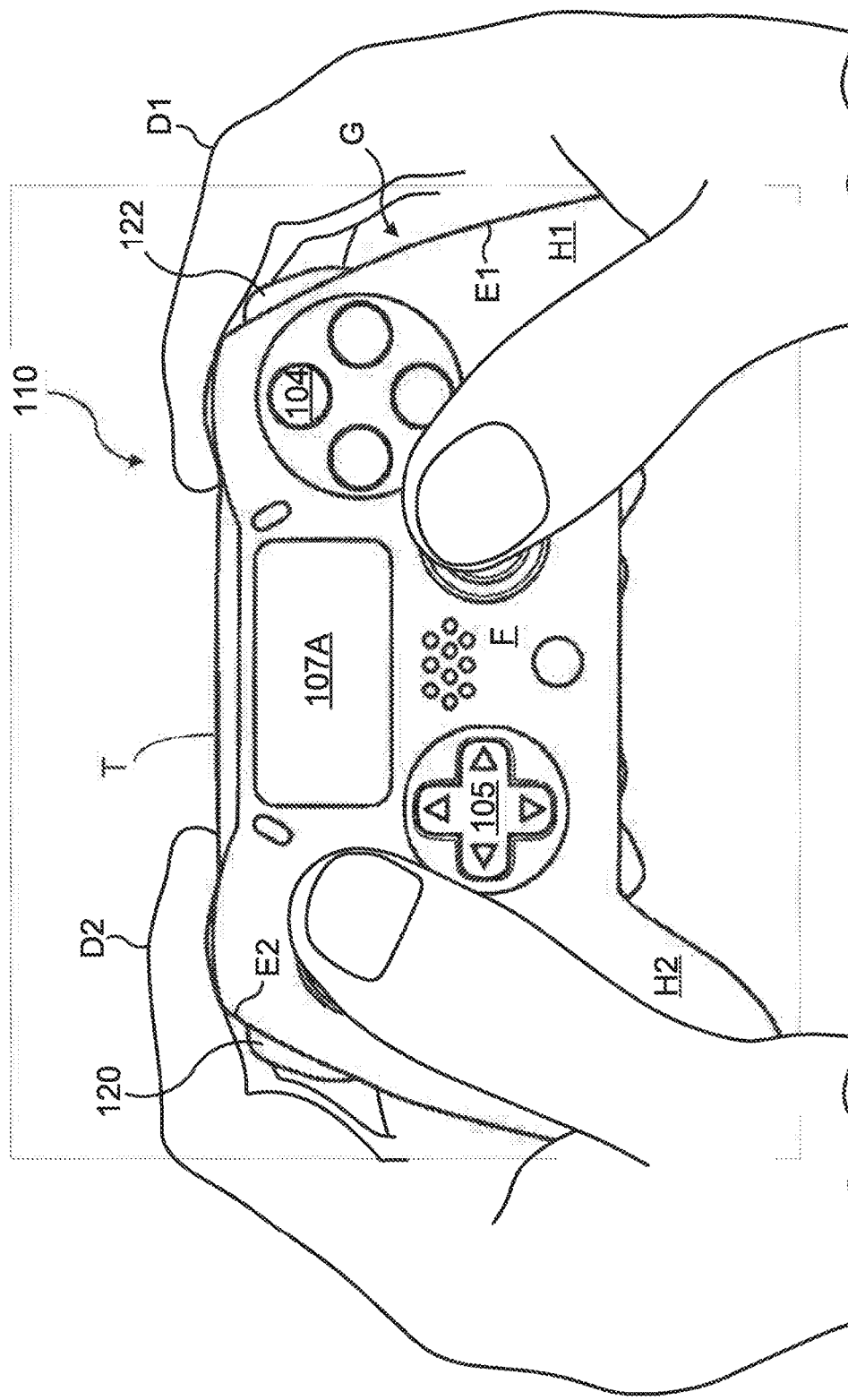
FIG. 1C depicts how a user may operate the input apparatus of FIG. 1A.
Figure 2A:
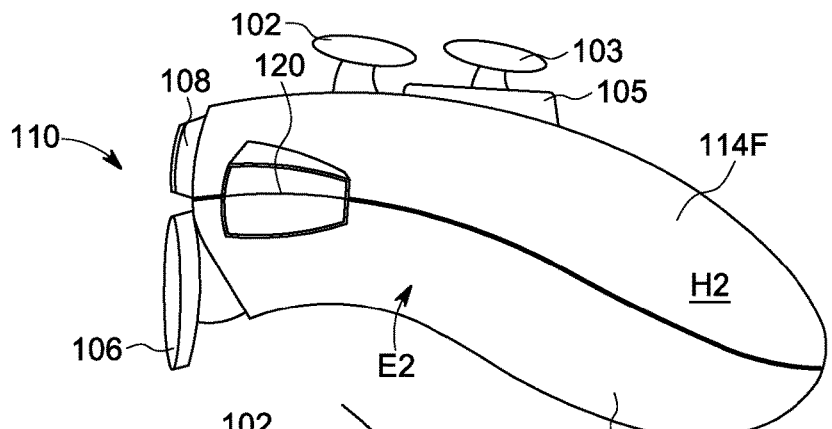
FIGS. 2A to 2D are further illustrations of the input apparatus shown in FIGS. 1A and 1B.
Figure 2B:
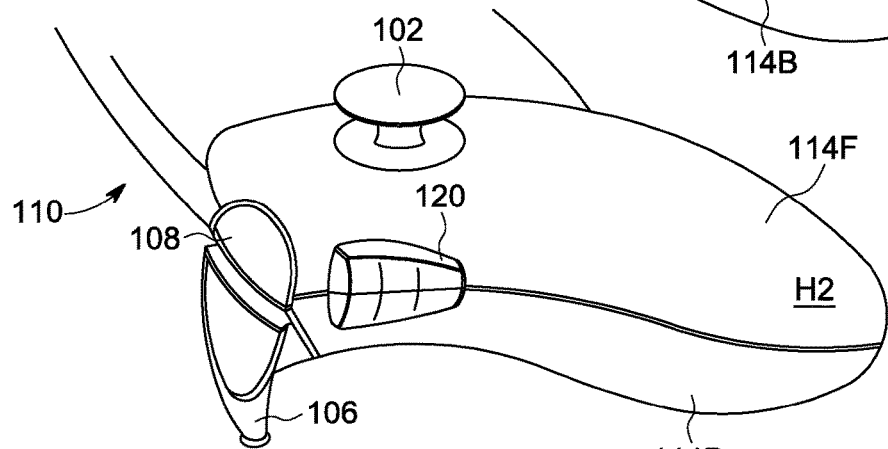
Figure 2C:
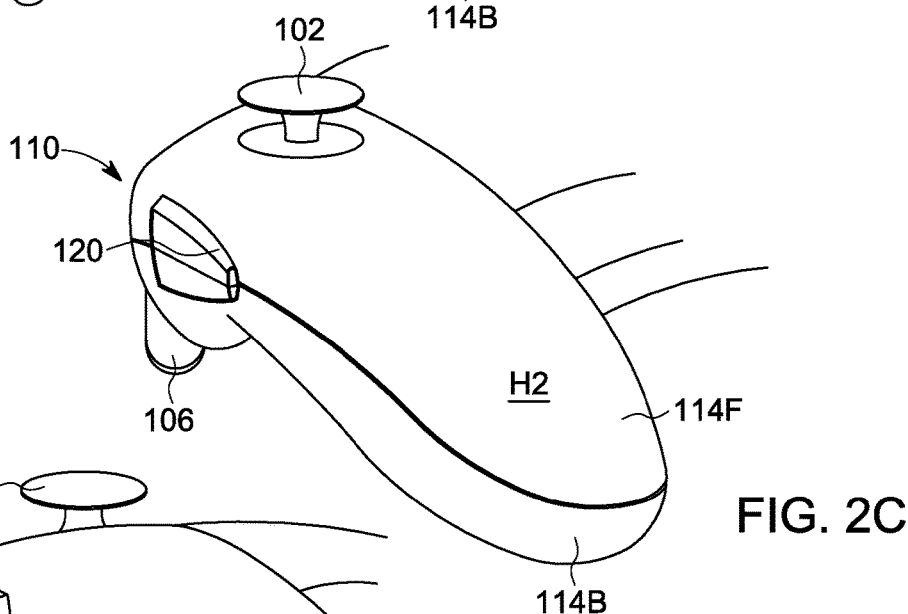
Figure 2D:
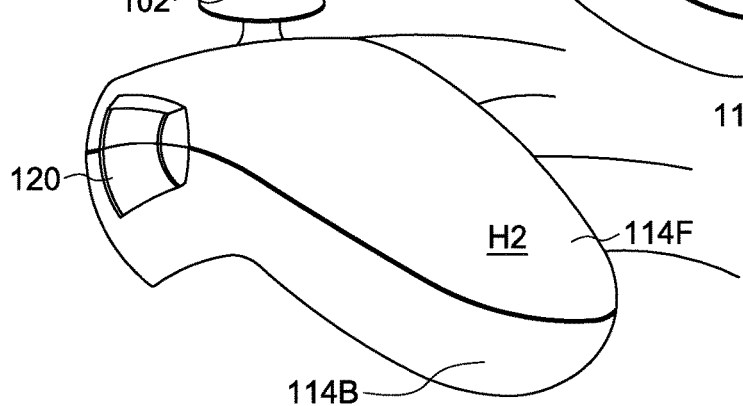
Figure 3A:
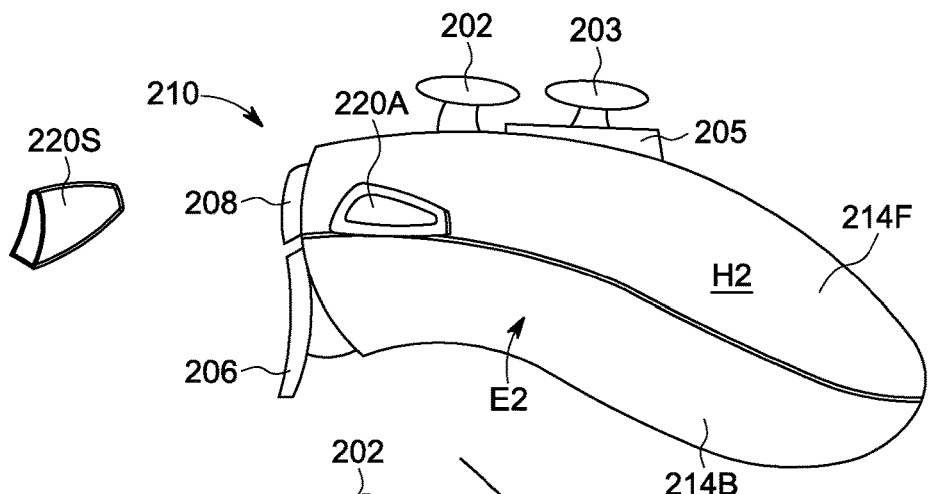
FIGS. 3A to 3D are schematic illustrations of an input apparatus for a games console controller according to further embodiments of the present disclosure.
Figure 3B:
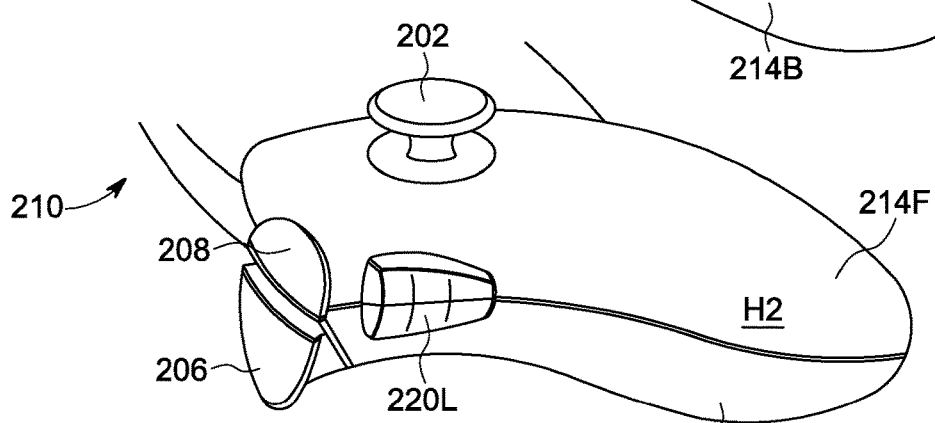
Figure 3C:
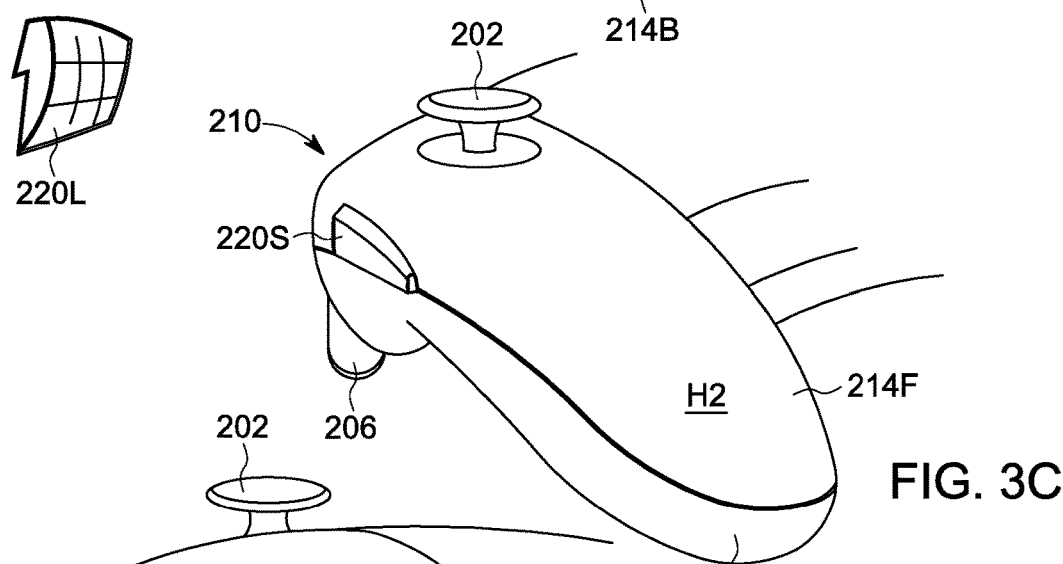
Figure 3D:
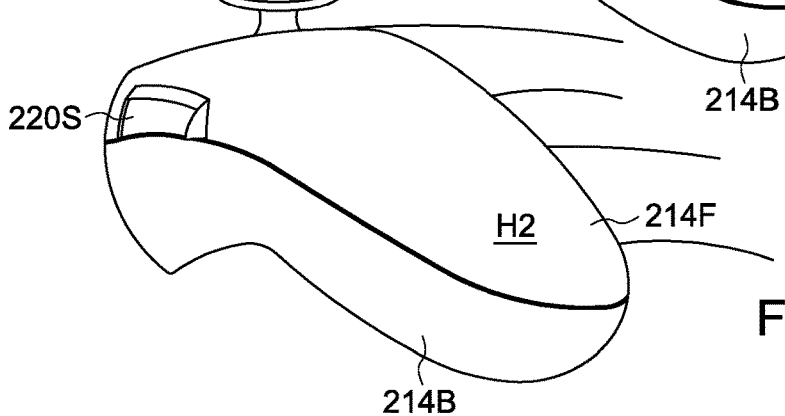

In order to operate the controls mounted upon the top T of the controller 110 a user will normally wrap their index fingers about the side edges or walls E1, E2 of the controller case 114, as shown in FIG. 1C. In FIG. 1C the index fingers D1, D2 are bent or crooked about forward or leading corners of the controller 110.

The user can operate either the left shoulder button 108 or left trigger 106 with the index finger D2 of their left hand and can operate either the right shoulder button 109 or right trigger 101 with the index finger D2 of their right hand (see FIG. 1C).

The user may also wrap their middle fingers about the side edges or walls E1, E2 of the controller case 114. The middle fingers may be bent or crooked about forward or leading corners of the controller 110. The user can operate the left shoulder button 108 with the index finger D2 of their left hand and can operate the right shoulder button 109 with the index finger D2 of their right hand and may operate the left trigger 106 with the middle finger of their left hand and may operate the right trigger 101 with the middle finger of their right hand.

The user may place the pad of the end of their index fingers D1, D2 and/or middle fingers on the controls on the top of the controller 110. When doing so the user fingers may leave a gap G between side walls E1, E2 of the controller case 114 and the adjacent finger.

The present disclosure provides an actuator or additional control 120, 122 upon at least one of the side walls E1, E2 of the controller case 114 proximate the top or leading edge T of the controller 110. The additional controls 120, 122 may be disposed in an upper region of the side walls E1, E2 of the controller case 114 that is to say proximate the front F of the controller 110. The additional controls 120, 122 are disposed in the crook of a respective one of the index fingers D1, D2, the additional controls 120, 122 may at least partially fill the gaps G.

The additional control 120, 122 are arranged to be operated by a user engaging or pressing the control 120, 122 with one of the phalanges of the index finger D1, D2 or middle finger, preferably the user's proximal phalanx or rather the fleshy part thereabout.

In this way the additional controls 120, 122 are operable by an intermediate portion of the user's index or middle finger, wherein the intermediate portion is disposed between the finger pad or end of the finger and the metacarpophalangeal joint.

In contrast to the shoulder buttons 108, 109 and the triggers 101, 106 which are operated by bending the index finger D1, D2, the additional controls 120, 122 may be operated by a straightening action of the index finger D1, D2 or middle finger. In this way the user's proximal phalanx is brought towards the additional control 120, 122 so as to activate the control 120, 122.

In this way the user may operate the additional controls 120, 122 when their index finger D1, D2 is at rest upon or aligned with the shoulder button 108, 109 or 122, when their index finger D1, D2 is at rest upon or aligned with the triggers 101, 106 or when their middle finger is at rest upon or aligned with the triggers 101, 106.

The user may operate the additional controls 120, 122 without altering the alignment of their index finger with whichever of the front controls, shoulder button or trigger, that their finger is poised over.

The additional control 120 may replicate at least one function of at least one of the controls disposed on the front or top of the controller 110, for example it may replicate the function operated by the left shoulder button 108, left trigger 106 or both the functions of the left shoulder button 108 and left trigger 106. The additional control 120 may replicate the function of one of the controls disposed on the front of the controller 110 for example, but not limited to, buttons 104.

The additional control 122 may replicate the function operated by either the right shoulder button 109 or right trigger 101. The additional control 122 may replicate the function of one of the controls disposed on the front of the controller 110 for example, but not limited to, buttons 104.

Alternatively, the additional controls 120, 122 may control a new command function.

In some embodiments, activation of one of the additional controls 120, 122 may change the command function or operation initiated by one of the other controls provided on the controller. When said one of the additional controls 120, 122 is in a first, "on" state the other control when actuated may initiated a first command function, whereas when said one of the additional controls 120, 122 is in a second, "off" state the other control when actuated may initiated a second, different, command function.

The additional controls 120, 122 may control two or more functions, the additional control 120, 122 may take the form of a rocker switch. The additional controls 120, 122 may be pivotally mounted about at least one axis x, y. Rotation of the additional controls 120, 122 in a first direction D1 about the pivot axis may activate a first sensor or switch (such as but not limited to a tact switch) rotation of the additional controls 120, 122 in a second opposing direction D2 about the pivot axis may activate a second sensor or switch.

Referring now to FIGS. 3A to 5E there are shown alternative embodiments of the present disclosure. In the second, third, fourth, fifth, sixth and seventh illustrated embodiments, like numerals have, where possible, been used to denote like parts, albeit with the addition of the prefixes "200", "300", "400", "500", "600" and "700" to indicate that these features belong to the second, third, fourth, fifth, sixth and seventh embodiments respectively. The alternative embodiments share many common features with the embodiment of FIGS. 1 to 2D, therefore only the differences from the embodiment illustrated in FIGS. 1 to 2D will be described in any greater detail.

FIGS. 3A to 3D illustrate a second embodiment of the present disclosure, the second embodiment comprises interchangeable or removable additional controls 220S, 220L. The controller 210 comprises a mounting base 220A in the side walls E2. The removable additional controls 220S, 220L may be mounted using mechanical fixing, clip or snap fitting such as but not limited to a bayonet style fitting. The fixing may enable the additional controls 220S, 220L to be mountable and/or removable without the use of a tool or instrument, in this way the additional controls 220S, 220L may be mounted and removed freehand.

In this way the additional controls 220S, 220L may be removed when not required by the user.

The user may change the additional controls 220S, 220L for example replacing a first, short, additional control 220S with a second, long, additional control 220L.

The first, short, additional control 220S may be arranged to be aligned with a user's finger (between the finger and the outer case of the controller 210) when said finger is placed on or aligned to operate the shoulder button 208. However, when said finger is placed on or aligned to operate the trigger 206 the finger may be misaligned with the first additional control 220S such that the user may not inadvertently activate the first additional control 220S.

The second, long, additional control 220L may be arranged to be aligned with a user's finger (between the finger and the outer case of the controller 210) when said finger is placed on or aligned to operate either the shoulder button 208 or the trigger 206. Alternatively, second, long, additional control 220L may be arranged to be aligned with a first finger of the user when the first finger is placed on or aligned to operate the shoulder button 208 and arranged to be aligned with a second finger of the user when the second finger is placed on or aligned to operate the trigger 206.

Alternatively, the first additional control 220S may be arranged to activate a first control function by actuating a first switch or sensor whereas the second additional control 220L may be arranged to activate a second control function by actuating a second switch or sensor or may be arranged to activate the first and second control functions by being capable of actuating the first and second switches or sensors.

A further advantage of the removable additional controls 220S, 220L allows customization of the controller to a specific user, software, game, computer or console. The choice of additional control 220S, 220L mounted to the controller may be a personal choice of comfort or ergonomics. For example, the shape and size of the additional control 220S, 220L may be dependent upon the size of the user's hand or upon the length, breadth or circumference of their fingers. The additional control 220S, 220L may also be an aesthetic choice.

Figure 4A:
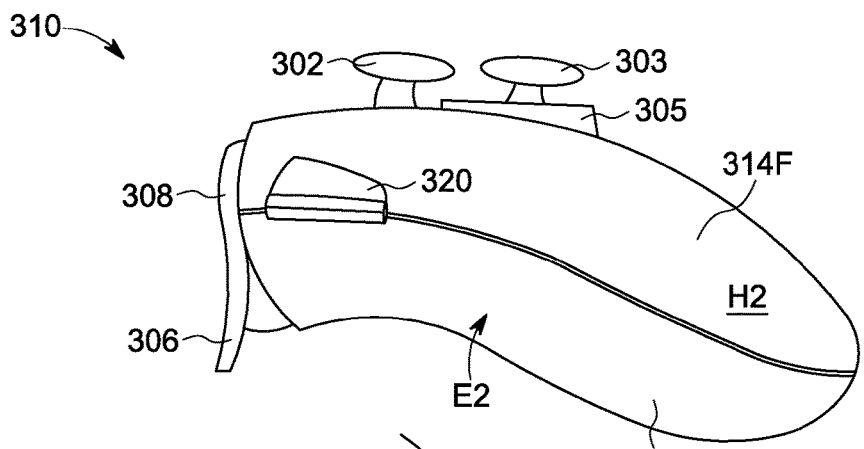
FIGS. 4A to 4D are schematic illustrations of an input apparatus for a games console controller according to further alternative embodiments of the present disclosure.
Figure 4B:
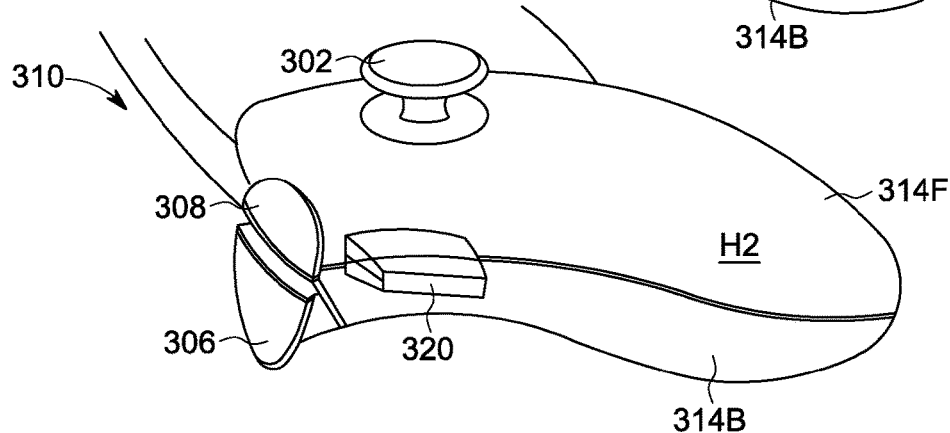

FIGS. 4A to 4B illustrate a third embodiment of the present disclosure, the third embodiment comprises an additional control 320 in the form of a toggle switch, the toggle switch may be a momentary toggle switch, and it may be a single throw or double throw. The additional control 320 comprises at least one engagement surface. The user may activate the additional control 320 by pressing or pushing against the engagement surface. The engagement surface may project outwardly from the outer case of the controller 310 substantially perpendicularly or radially from the outer case of the controller 310. In the illustrated embodiment the additional control 320 comprises a pair of engagement surfaces, a first engagement surface is arranged in opposition to the second surface. The first engagement surface is provided by an upper surface of the portion of the additional control 320 projecting from the side wall E1, E2 of the controller 310. The second engagement surface is provided by a lower surface of the portion of the additional control 320 projecting from the side wall E1, E2 of the controller 310. In this way the additional control 320 may be activated by a movement of the user's finger either towards the front F or the back B of the controller 310 this referred to herein as a vertical direction. The vertical direction is a first direction which extends between the front F and the back B of the controller 110, irrespective of the actual orientation of the controller 310.

A horizontal direction is a second direction which extends between side walls E1, E2 of the controller 310, irrespective of the actual orientation of the controller 310. The additional controls 120, 122, 220S, 220L of the first and second illustrated embodiments may be activated by movement of at least a portion of the user's finger in the horizontal direction.

Figure 4C:
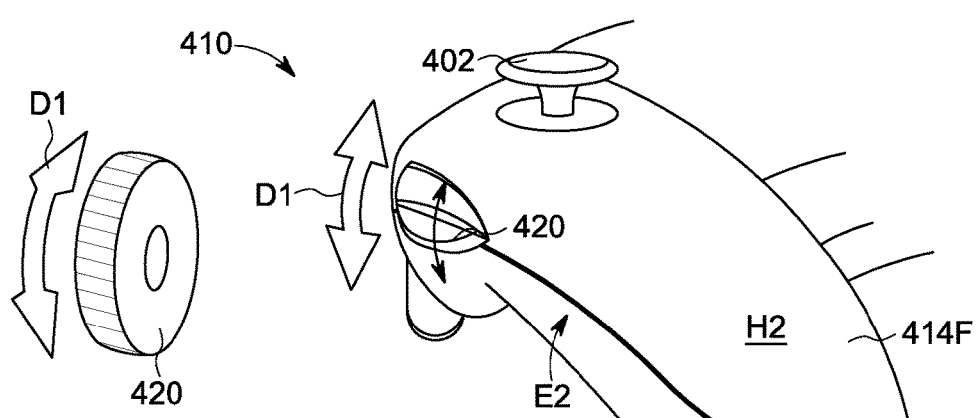
Figure 4D:
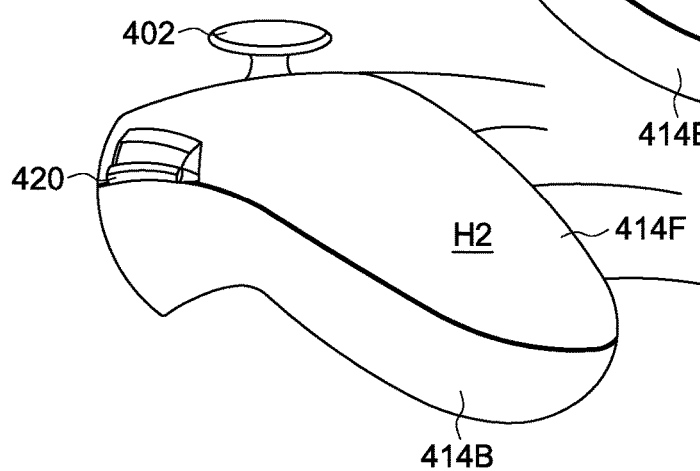

FIGS. 4C to 4D illustrate a fourth embodiment of the present disclosure, the fourth embodiment comprises an additional control 420 in the form of a wheel or rotary switch. The additional control 420 may be activated in a similar fashion to that of the third illustrated embodiment, but provides a plurality of input positions and can be operated by rotation in two directions. Such switch may find application as but not limited to a zoom function, pitch, roll or yaw control.

FIGS. 5A to 5E illustrate fifth, sixth and seventh embodiments of the present disclosure, the fifth, sixth and seventh embodiments comprise an additional control 520, 620, 720 which are adapted to follow the contours of the outer case of the controller 510, 610, 710.

The additional control 520, 620, 720 is disposed between the user's hand and the outer case of the controller 510, 610, 710. The additional control 520, 620, 720 may be activated by the user tightening or changing their grip of the handle H2 of the controller 510, 610, 710.

In the fifth embodiment the additional control 520 takes the form of an elongate member extending along the side wall E2 of the controller 510. The elongate member may be mounted at one end to the controller 510. A portion of the elongate member may extend over the outer surface of the case of the controller 510.

In the sixth embodiment the additional control 620 takes the form of a "T" or "Y" shaped member extending about the side wall E2 of the controller 510.

The additional control 620 may be mounted at one end to the controller 510.

A first portion of the additional control 620 may extend in a second horizontal direction. The second horizontal direction is a third direction which extends between top T and the bottom B of the controller 510, irrespective of the actual orientation of the controller 510.

A second portion 620A of the additional control 620 may extend from the first portion over or towards the front of the controller 510. The second portion 620A of the additional control 620 may be operable by user pressing the base of their thumb (the proximal end of the proximal phalanx or the adjacent metacarpal or metacarpophalangeal joint) against the second portion 620A.

A third portion 620B of the additional control 620 may extend from the first portion under or towards the rear of the controller 510. The third portion 620B of the additional control 620 may be operable by user pressing the metacarpophalangeal joint of the index or middle finger or proximate regions of their hand such as the palm of their hand against the third portion 620B.

The third portion 620B may extend in opposition to the second portion 620A.

Each of the second and third portions 620A, 620B may be arranged to activate a respective first or second switch or sensor. In this way the additional control 620 may provide two control functions.

In the seventh embodiment the additional control 720 takes the form of a curved elongate member extending along the side wall E2 of the controller 510 and about the bottom B of the controller 710 more specifically the curved elongate member extends about a trailing edge of the handle H2. The elongate member may be mounted at one end to the controller 510. A portion of the elongate member may extend over the outer surface of the case of the controller 510.

In other embodiments the additional controls 520, 620, 720 may extend through opening or cutaways in the outer case of the controller. The opening being similarly shaped to the additional control 520, 620, 720.

Figure 6:
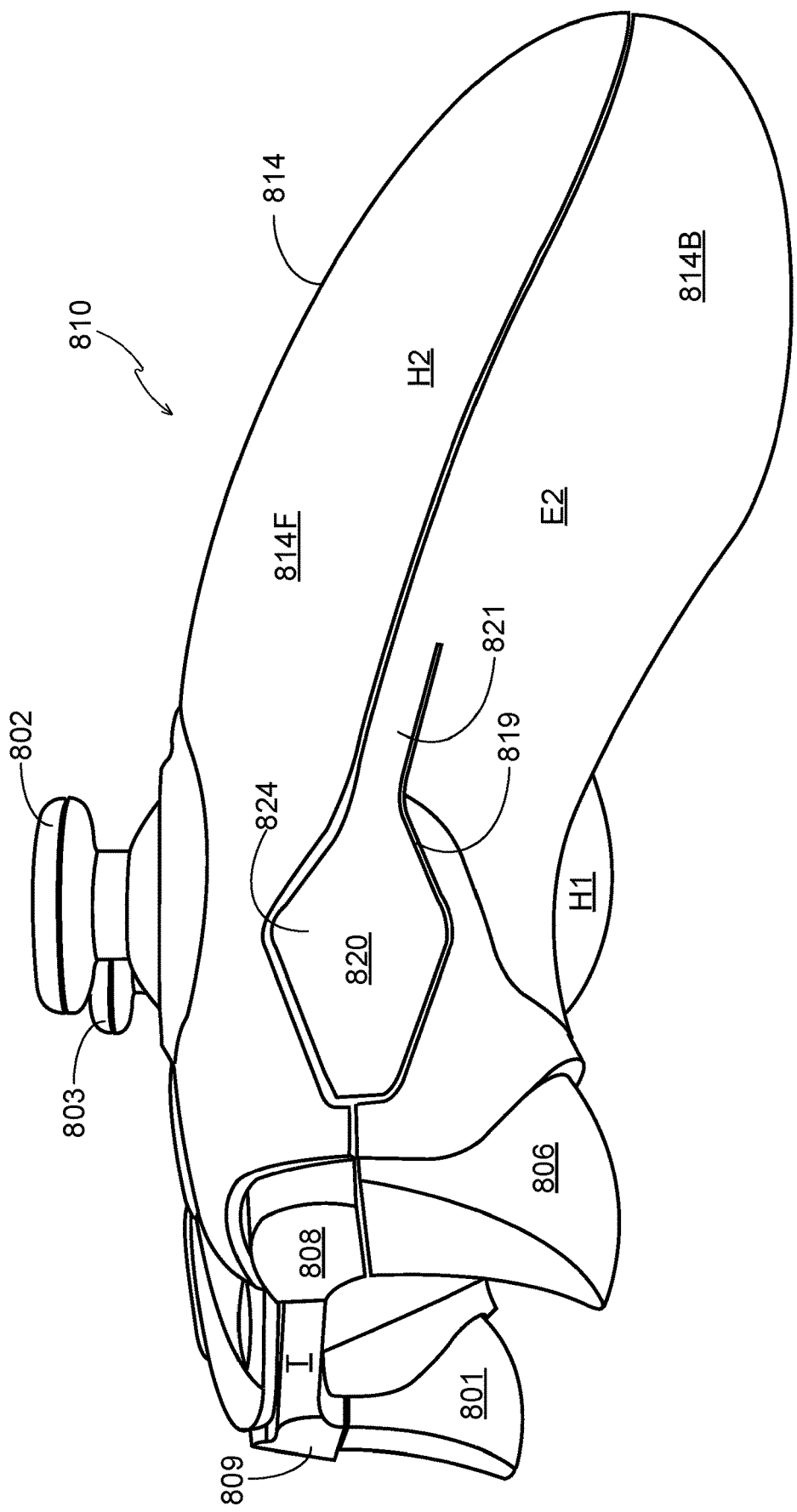
FIG. 6 is a perspective view from above of an input apparatus for a games console controller according to another embodiment of the present disclosure.
Figure 7:
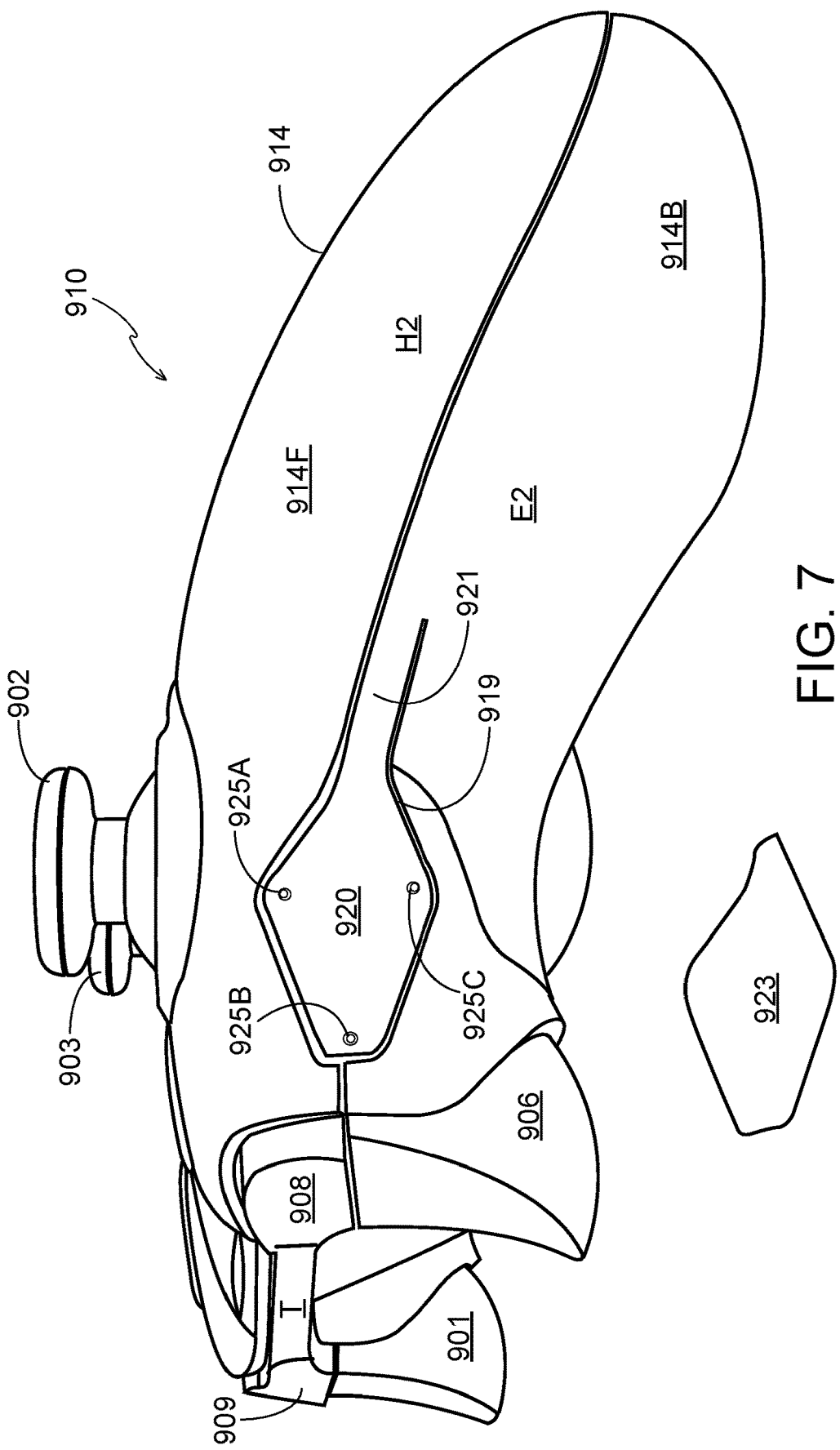
FIG. 7 is a perspective view from above of an input apparatus for a games console controller according to yet another embodiment of the present disclosure.
Figure 8:
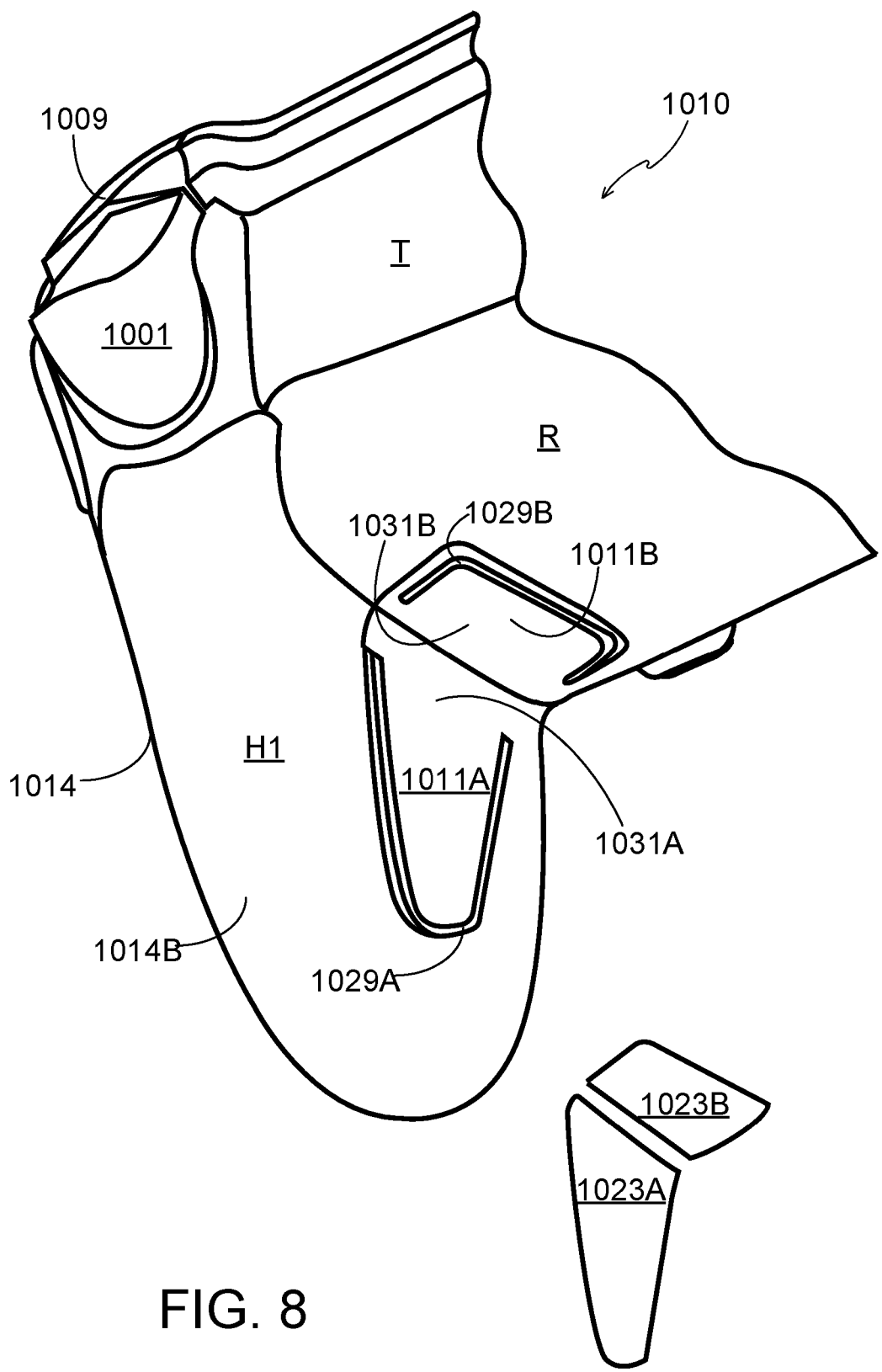
FIG. 8 is a perspective view from above of an input apparatus for a games console controller according to still yet another embodiment of the present disclosure.

Referring now to FIGS. 6 to 8 there are shown further alternative embodiments of the present disclosure. In the eighth, ninth and tenth illustrated embodiments, like numerals have, where possible, been used to denote like parts, albeit with the addition of the prefixes "800", "900", and "1000" to indicate that these features belong to the eighth, ninth and tenth embodiments respectively. The alternative embodiments share many common features with the embodiment of FIGS. 1 to 5E, therefore only the differences from the embodiment illustrated in FIGS. 1 to 5E will be described in any greater detail.

FIG. 6 shows an apparatus or controller 810 that comprises an outer case or shell 814 having opposing side walls E2. The case 814 may comprise one or more panels fitted together and or mounted to a chassis member (not shown). The case 814 may comprise a front body panel 814F and a rear body panel 814B. The outer case 814 comprises a void in which electronic components (such as, but not limited to, switches and/or sensors) are located.

The controller 810 comprises an actuator or additional control 820 upon at least one of the side walls E2 of the controller case 814. The additional control 820 is located towards or proximate the top or leading edge T of the controller 810. The additional control 820 may be disposed in a medial region of the side walls E2 of the controller case 814.

The additional control 820 is integral with outer case or shell 814 of the controller 810.

The additional control 820 is integral with one of the front body panel 814F and a rear body panel 814B. In the illustrated embodiment additional control 820 is integral with the rear body panel 814B.

The additional control 820 is defined, at least in part by a cutaway in the form of a slot or slit 819 provided in the rear body panel 814B.

The additional control 820 comprises a head portion 824 and a shaft 821. The head portion 824 provide an engagement region with which a user may interact, press or engage. The head portion 824 may be shaped so as to facilitate user interaction. In some embodiments the head portion 824 may be profiled or convex so as to extend or project outwardly from the side wall E2 of the controller case 814. In other embodiments the head portion 824 may be profiled or concave so as to recess inwardly from the side wall E2 of the controller case 814. In other embodiments the head portion 824 may be substantially flush with the side wall E2 of the controller case 814.

The front body panel 814F may comprise a recess or cutaway to accommodate an upper region of the head portion 824.

The shaft 821 forms a living hinge. The additional control 820 being moveable with respect to the outer case 814. In particular the head portion 824 is displaceable from a normal or rest position to a second position in which a switch or sensor associated with the additional control 820 is activated. The shaft 812 flexes, bends or deforms when the additional control 820 is actuated.

When released by a user the additional control 820 returns to the rest position. The additional control 820 is resiliently biased to return to the rest position. A bias mechanism is provided, the bias mechanism may be a spring or similar device. The bias mechanism may be part of the switch or sensor. In some embodiments the bias mechanism may be provided by natural or inherent resilience of the shaft 812.

The additional control 820 is formed from material which would otherwise form part of the outer case 814.

A mechanism may be provided to disable the additional control 820. The mechanism may take the form of a cam located within the void outer of the case 814. The cam may be moved or rotated into a position in engagement with an inner surface of the additional control 820 so as to inhibit or prevent displacement of the additional control 820. In this way the additional control effectively becomes a rigid portion of the outer case 814.

In other embodiments the additional control 820 may be disabled by moving the switch or sensor within the controller 810 such that displacement of the additional control 820 cannot affect actuation of the switch or sensor. In still other embodiments the additional control 820 may be disabled in software such that any actuation of the switch or sensor by the additional control 820 is ignored by the controller 810 or other apparatus with which it is in communication.

In some embodiments the additional control 820 may be a touch sensitive pad or region provided in the outer case of the apparatus 810, where the touch sensing may be provided by a capacitive touch sensor, resistive touch sensor, or other type of touch sensing. Additionally, or alternatively, in some embodiments the additional control 820 may be a gesture sensitive pad or region provided in the outer case of the apparatus 810, where the gesture sensing may be provided by optical sensors or any other type of sensor for detecting gestures.

FIG. 7 shows an apparatus or controller 910 substantially similar in construction to that of FIG. 6, the controller 910 comprises an outer case or shell 814 having opposing side walls E2. An actuator or additional control 920 is provided in at least one of the side walls E2 of the controller case 914.

The additional control 920 comprises one or more mounting members 925A, 925B, 925C. The mounting members 925A, 925B, 925C facilitate attachment of a pad or grip element which may take the form of a rubber or similar material. The mounting members 925A, 925B, 925C may take the form of a snap or bayonet fitting or may be magnetic fittings.

FIG. 8 shows an apparatus or controller 1010 comprising an outer case or shell 1014 having opposing side walls E2. The case 1014 may comprise one or more panels fitted together and or mounted to a chassis member. The case 1014 may comprise a front body panel and a rear body panel 1014B. The outer case 1014 comprises a void in which electronic components (such as, but not limited to, switches and/or sensors) are located.

The controller 1010 comprises at least one actuator or additional control 1011A, 1011B in a rear face of the controller 1010.

The controller 1010 comprises at least one handle H2. The controller 1010 comprises two handles H2, only one of which is shown in FIG. 8, disposed on opposing sides of an intermediate body portion.

The controller 1010 may comprise a first additional control 1011A provided in an inner rear surface of the handle H2.

The first additional control 1011A integral with outer case or shell 1014 of the controller 1010.

The first additional control 1011A is integral with the rear body panel 1014B forming the handle H2.

The first additional control 1011A is defined, at least in part by a cutaway 1029A in the form of a slot or slit provided in the handle H2. The cutaway 1029A is substantially "U" shaped, such that a displaceable region of the handle H2 is provided. A proximal end of the displaceable region of the handle H2 is coupled or connected to the handle H2 by a living or integral hinge 1031A.

The controller 1010 may comprise a second additional control 1011B provided in a rear surface of the intermediate body portion. The second additional control 1011B is provide in a region of the intermediate body portion adjacent, or proximate, to the handle H2.

The second additional control 1011B is defined, at least in part by a cutaway 1029B in the form of a slot or slit provided in the intermediate body portion. The cutaway 1029B is substantially "U" shaped, such that a displaceable region of the intermediate body portion is provided. A proximal end of the displaceable region of the intermediate body portion is coupled or connected to the intermediate body portion by a living or integral hinge 1031B.

It is envisaged that the other, opposing handle H1 (see FIG. 1A) may comprise a third additional control similarly arranged to the first additional control 1011A and that the intermediate body portion may comprise fourth additional control similarly arranged to the second additional control 1011B.

A pad or grip element may be provided, the grip element may be detachable so as to be replaceable or customizable; in such embodiments the first and/or second additional control 1011A, 1011B may be provided with mounting members (not shown) similar to the embodiment shown in FIG. 7 and/or described above. A grip element may be provided for one or both of first and second additional controls 1011A, 1011B.

The first and second additional controls 1011A, 1011B are integral with outer case or shell 1014 of the controller 1010.

In some embodiments the first and second additional controls 1011A, 1011B may be profiled or convex so as to extend or project outwardly from the controller case 1014. In other embodiments the first and second additional controls 1011A, 1011B may be profiled or concave so as to recess inwardly of the controller case 1014. In other embodiments the first and second additional controls 1011A, 1011B may be substantially flush with the controller case 1014.

Each of the first and second additional controls 1011A, 1011B is moveable with respect to the outer case 1014. In particular a distal region of each of the first and second additional controls 1011A, 1011B, opposing the respective living hinge 1031A, 1031B, is displaceable from a normal or rest position to a second position in which a switch or sensor associated with respective one of the first and second additional controls 1011A, 1011B is activated. The first and/or second additional control 1011A, 1011B flexes, bend or deforms when actuated.

The user may operate the first and second additional controls 1011A, 1011B with a grip finger, that is to say a finger employed to grasp the handle H2; typically, the middle, ring and little fingers. Although it is envisaged that the index finger could be employed to actuate the first and second additional controls 1011A, 1011B.

When released by a user the first or second additional control 1011A, 1011B returns to the rest position. Each of the first and second additional controls 1011A, 1011B is resiliently biased to return to the rest position. A bias mechanism is provided, the bias mechanism may be a spring or similar device. The bias mechanism may be part of the switch or sensor. In some embodiments the bias mechanism may be provided by natural or inherent resilience of the material forming the outer case from which the first and second additional controls 1011A, 1011B are struck from or provided by.

The first and second additional controls 1011A, 1011B are formed from material which would otherwise form part of the outer case 1014.

A mechanism may be provided to disable each of the first and second additional controls 1011A, 1011B respectively. The mechanism may take the form of a cam located within the void outer of the case 1014. The cam may be moved or rotated into a position in engagement with an inner surface of one of the first and second additional controls 1011A, 1011B so as to inhibit or prevent displacement of that additional control 1011A, 1011B. In this way the additional control effectively becomes a rigid portion of the outer case 1014.

Referring now to FIGS. 9A to 12 there are shown further alternative embodiments of the present disclosure. In the eleventh and twelfth illustrated embodiments, like numerals have, where possible, been used to denote like parts, albeit with the addition of the prefixes "1100" and "1200", to indicate that these features belong to the eleventh and twelfth embodiments respectively. The alternative embodiments share many common features with the embodiment of FIGS. 1 to 8, therefore only the differences from the embodiment illustrated in FIGS. 1 to 8 will be described in any greater detail.

Figure 9A:
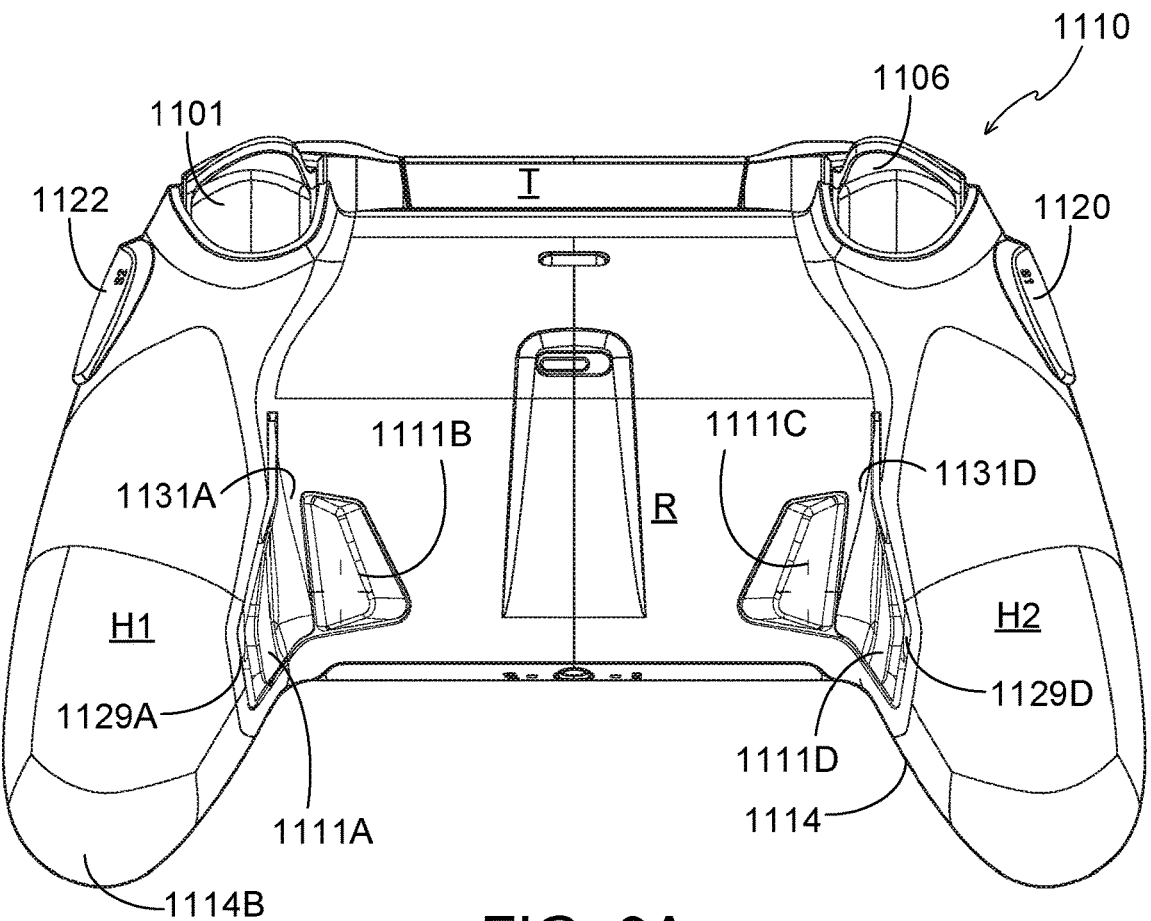
FIGS. 9A, 9B and 10 illustrate an input apparatus for a games console controller according to yet a further embodiment of the present disclosure.
Figure 9B:
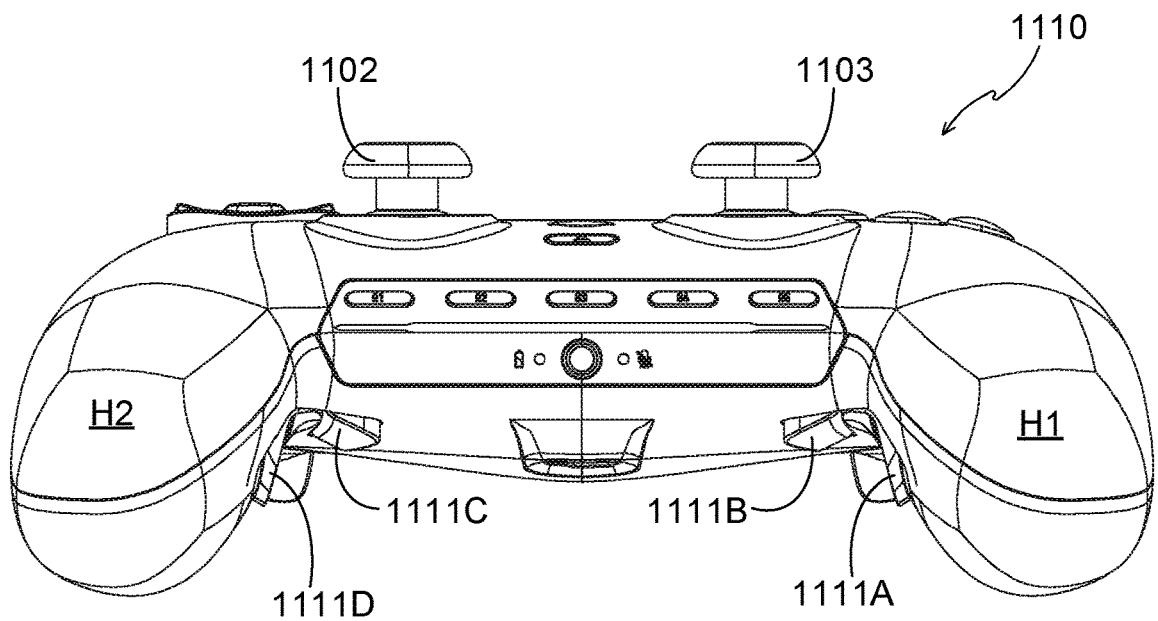
Figure 10:
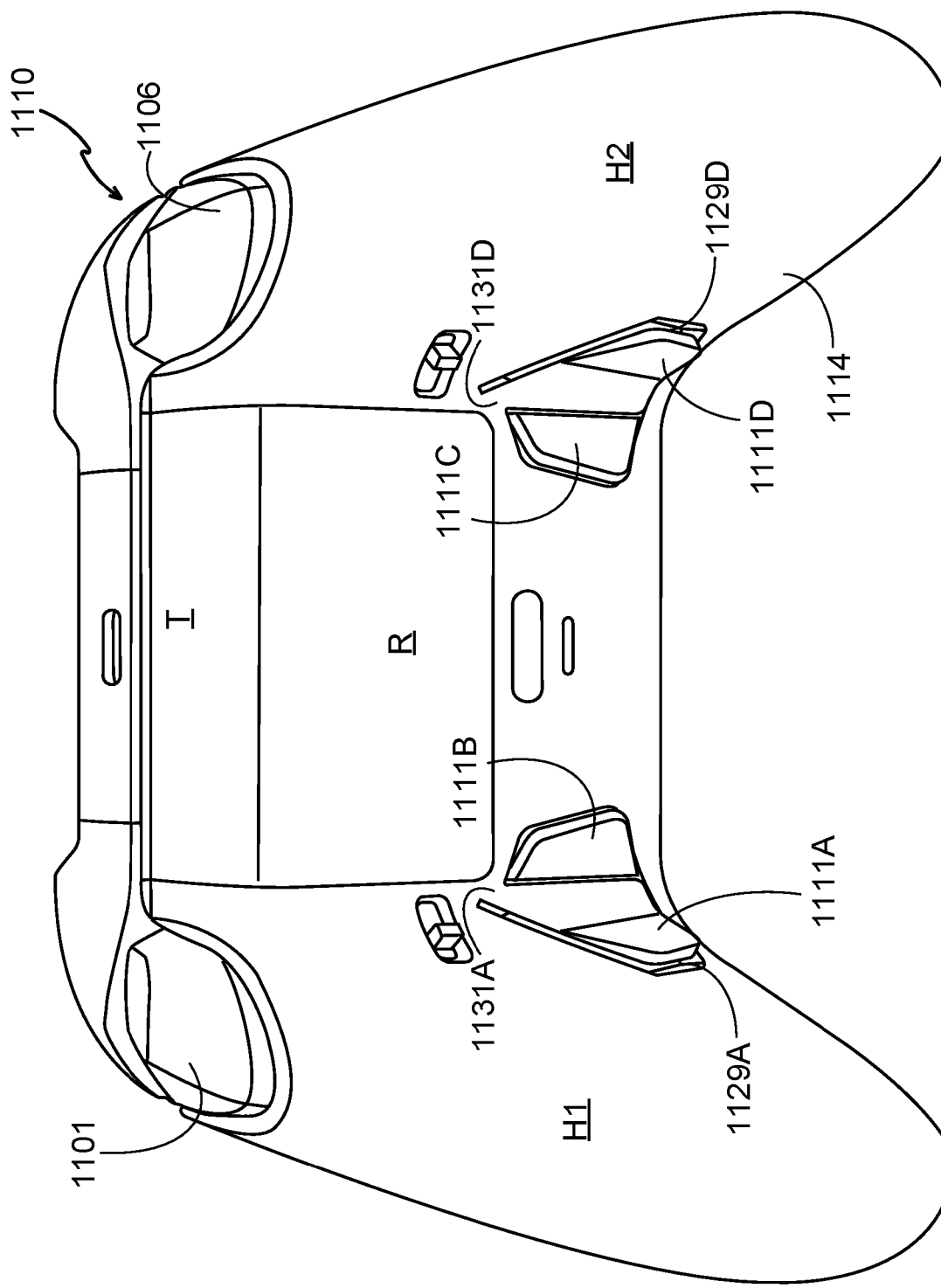

FIGS. 9A, 9B and 10 illustrate an eleventh embodiment. FIGS. 9A and 10 show a back or rear face R of an apparatus 1110 for controlling a computer program. FIG. 9B shows a bottom view of the apparatus 1110, the bottom end of the apparatus 1110 is configured to face towards a user in normal operation when held in both hands. The apparatus 1110 comprises a case or housing 1114. The housing 1114 provides a pair of handles H1, H2 disposed on opposing sides of an intermediate or medial portion. The apparatus 1110 comprises input controls, a top face T comprises input controls in the form of triggers 1101, 1106 configured to be operated by a user's left or right index fingers. The apparatus 1110 comprises input controls on a front face, the front face input controls may take the form of thumb sticks 1102, 1103, buttons, "D-pad", touch pad or other suitable input device.

Optionally, side faces or edges of the apparatus 1110 may comprise further input controls, for example, but not limited to, buttons 1120, 1122 (see FIG. 9A).

The apparatus 1110 comprises additional input controls 1111A, 1111B, 1111C, 1111D on the rear face R or on the inner walls of the handles H1, H2 or alternatively on both the rear face R and the inner walls of the handles H1, H2.

The additional input controls 1111A, 1111B, 1111C, 1111D are configured to activate a switch or sensor disposed internally thereof. The switch or sensor may be mounted internally, at least in part, of the housing 1114

One or more of the additional input controls 1111A, 1111D (also referred to herein as integral input controls 1111A, 1111D) may be formed in or integral with the housing 1114 of the apparatus 1110 and comprise a living or live hinge 1131A, 1131D. In this way the additional input controls 1111A, 1111D are unitary with the housing 1114 or a panel thereof.

One or more of the additional input controls 1111B, 1111C may be separate from the housing 1114 of the apparatus 1110. The discrete additional input controls 1111B, 1111C may be affixed to the housing 1114. The discrete additional input controls 1111B, 1111C may be mounted to the housing by a mounting mechanism disposed within the interior of the housing 1114. The discrete additional input controls 1111B, 1111C may be slidably, depressibly, rotationally or pivotally mounted to the housing 1114. A receiver may be provided by the housing 1114, the discrete additional input controls 1111B, 1111C may comprises a catch, lug, detent, trunnion or other element receivable in the receiver. It will be appreciated that in alternative embodiments the discrete additional input controls 1111B, 1111C may be provided with the receiver for receiving a portion of the mounting mechanism provided by the housing 1114. The discrete additional input controls 1111B, 1111C may extend through an opening in the outer case 1114. In other embodiments the discrete additional input controls 1111B, 1111C may affixed or mounted to an outer surface of the case 1114 and extend over a portion of the case 1114 in close proximity thereto.

The discrete additional input controls 1111B, 1111C are provided at a region of rear case disposed between the handles H1, H2. The apparatus 1110 comprises two discrete additional input controls 1111B, 1111C. Each discrete additional input controls 1111B, 1111C is disposed proximate to one of the pair of handles H1, H2.

Each discrete additional input controls 1111B, 1111C may be pivotally coupled to the apparatus 1110. The discrete additional input controls 1111B, 1111C may be comprise a first side which is a fixed or pivotal side and second side which is a free or moveable side. In the illustrated embodiment the fixed side is disposed in closest proximity to the adjacent handle H1, H2. In other embodiments the fixed and free sides may be reversed such that the free or moveable side is in closest proximity to the adjacent handle H1, H2. The discrete additional input controls 1111B, 1111C comprise a body which is engaged by the user. The body may be arranged such that the free or moveable side projects or protrudes outwardly of the housing 1114 so as to stand proud of the adjacent region of the outer case 1114. The fixed or pivotal side may be flush with the housing 1114. In other embodiments the fixed side may be inset with respect to the housing, that is to say disposed within the interior of the housing 1114. In still other embodiments the fixed or pivotal side may protrude from the housing albeit to a lesser extent than the free side.

The integral input controls 1111A, 1111D comprise a first end defined by the living hinge 1131A, 1131D. A second end of integral input controls 1111A, 1111D substantially opposes the first end. The second end may be arranged to project or protrude outwardly with respect to the surrounding region of the housing 1114 so as to stand proud of the adjacent region of the outer case 1114. This may be achieved by shaping the integral input controls 1111A, 1111D to be noncoplanar with the surrounding region of the housing 1114. In some embodiments the integral input controls 1111A, 1111D may be flared or tapered in shape so as to increase in thickness towards the second end.

In alternative embodiments the integral input controls 1111A, 1111D comprises a member arranged to be flush or inset (at least in part) with respect to the outer case 1114 surrounding it.

The second end is a free or floating end which is displaceable with respect to the housing 1114. The first end is a fixed end.

The integral input controls 1111A, 1111D may be defined by a cut out 1129 in the form of a slot, slit or aperture formed in the housing 1114.

The cut out 1129 may be integral or unitary with an opening in the housing 1114 through which the discrete additional input controls 1111B, 1111C extend.

In other embodiments the housing 1114 may be formed from two or more separate case components, the integral input controls 1111A, 1111D may be integral with one of said components. A portion of the two or more case components may at least partially surround the integral input controls 1111A, 1111D.

The integral input controls 1111A, 1111D are arranged to flex, bend, deform or pivot to activate a single switch or sensor. The integral input controls 1111A, 1111D move reciprocally, the natural or inherent resilience of the material from which they are formed biases the controls 1111A, 1111D towards an initial or rest position. In some embodiments an external or additional bias may be applied to the controls 1111A, 1111D by a resilient device such as a spring, such device may form part of a switch or sensor mechanism associated with the control 1111A, 1111D.

The apparatus 1110 shown in FIGS. 9A, 9B and 10 comprises four additional input controls 1111A, 1111B, 1111C, 1111D, each activating a single switch or sensor. In other embodiments the apparatus 1110 may comprise less than four additional input controls 1111A, 1111B, 1111C, 1111D, such as, but not limited to, two additional input controls 1111A, 1111B, 1111C, 1111D, this may be achieved in one embodiment by omitting the discrete additional input controls 1111B, 1111C.

Figure 11A:
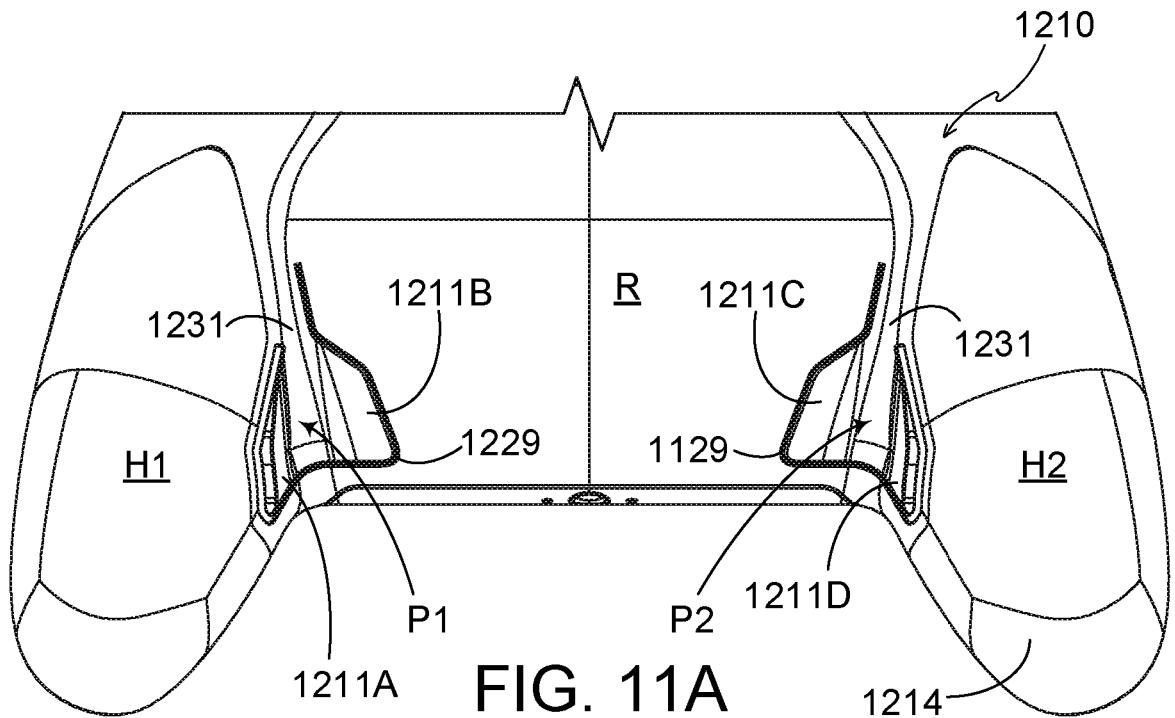
FIGS. 11A, 11B and 12 illustrate an input apparatus for a games console controller according to still yet a further embodiment of the present disclosure.
Figure 11B:
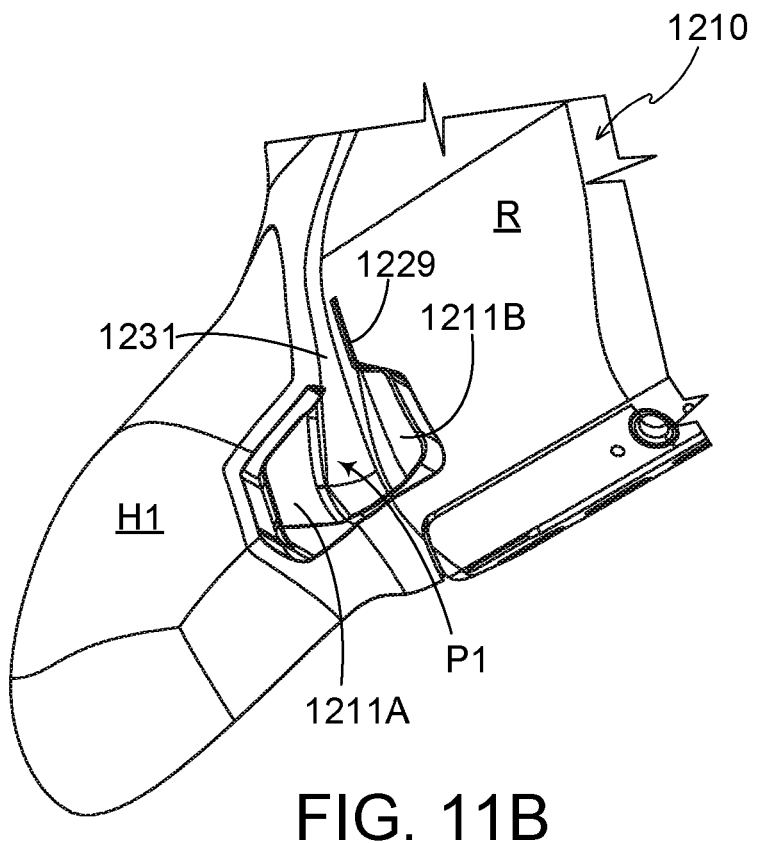
Figure 12:
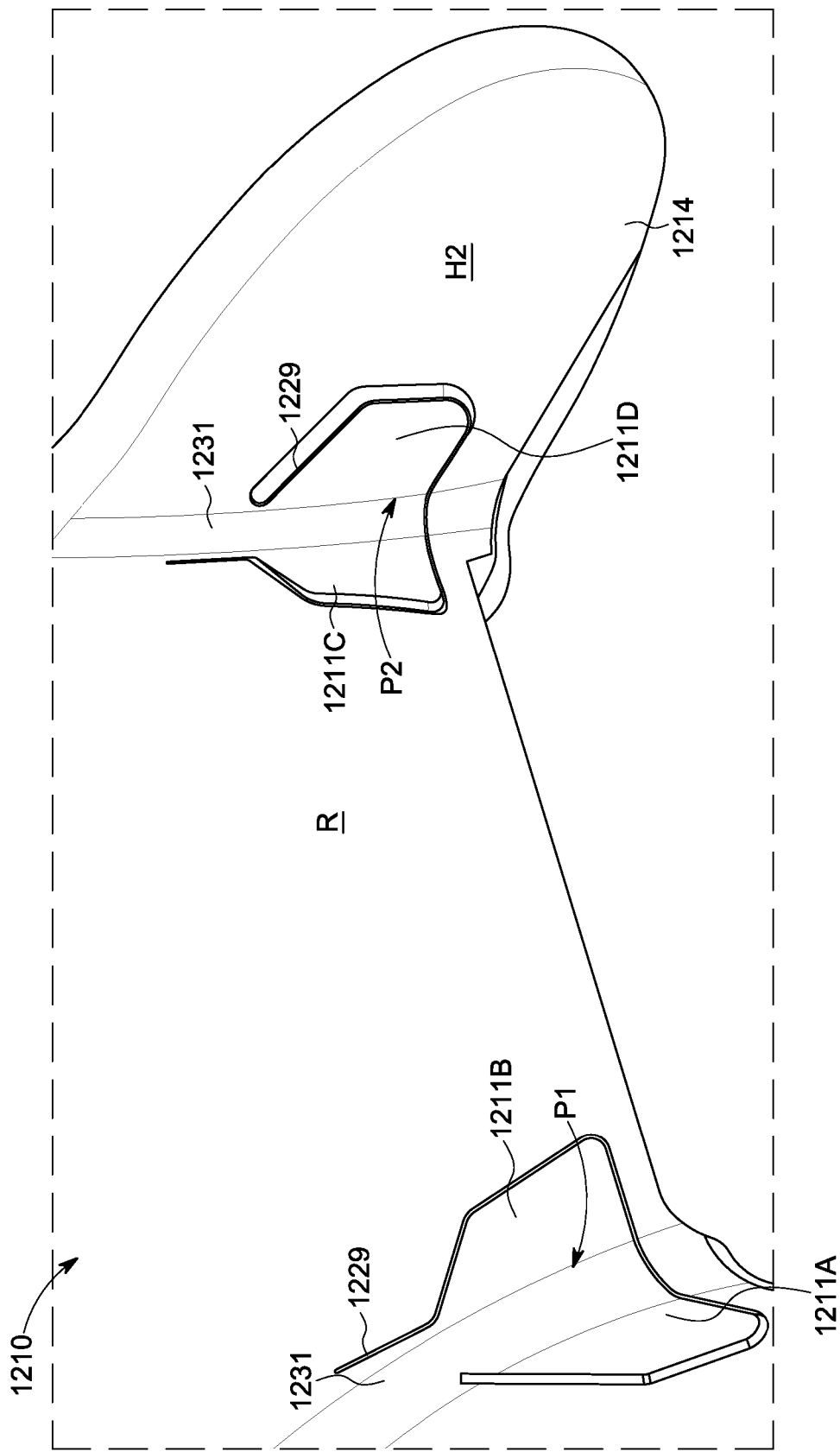

FIGS. 11A, 11B and 12 illustrate a twelfth embodiment FIGS. 11A, 11B and 12 show a back or rear face R of an apparatus 1210 for controlling a computer program. The apparatus comprises a case or housing 1214. The housing 1214 provides a pair of handles H1, H2 disposed on opposing sides of an intermediate or medial portion.

The apparatus 1210 comprises four additional input controls 1211A, 1211B, 1211C, 1211D arranged in pairs. The additional input controls 1211A, 1211B, 1211C, 1211D in each pair are integral with each other.

The apparatus 1210 comprises a pair of cut outs 1229, each cut out 1229 defines a control member or paddle P1, P2. The illustrated embodiment comprises two control members or paddles P1, P2.

Each control member P1, P2 is integral with the housing 1114. Each cut out 1229 defines a juncture 1231 between the control member P1, P2 and the housing 1114.

Each control member P1, P2 is configured to activate at least two switches or sensors. In this way each control member P1, P2 provides at least two additional input controls 1211A, 1211B, 1211C, 1211D.

Each control member P1, P2 is flexible or deformable mounted to the housing 1114. Each control member P1, P2 comprises at least one living hinge about which the control member P1, P2 may be twistable or pivotable or otherwise displaceable. Each control member P1, P2 may comprise two or more living hinges.

Each control member P1, P2 comprises two or more engagement regions, each arranged to activate a respective switch or sensor. Each of the engagement regions may be arranged so as to stand proud of the adjacent region of the outer case 1214. A user may engage one of the engagement regions to activate one of the switches or sensors. In some embodiments the apparatus 1210 may be arranged such that the user may engage the control member P1, P2 so as to simultaneously activate two or more switches or sensors. Simultaneously activating two or more switches or sensors may provide a further input control which is operable from or by the control member P1, P2.

It can be appreciated that various changes may be made within the scope of the present invention. For example, the size and shape of the paddles may be adjusted to accommodate controllers of differing size or shape.

In some embodiments the additional input controls 1111A, 1111B, 1111C, 1111D; 1211A, 1211B, 1211C, 1211D may be provide by one or more touch sensitive regions provided in the rear of the apparatus 1110; 1210. The touch sensitive region may be provided on the rear face R of the apparatus on a region of the housing between the handles H1, H2, the touch sensitive region may be provided on the inner walls of the handles H1, H2 or alternatively on both the rear face R and the inner walls of the handles H1, H2.

Touch sensitive pads or regions may be configured to detect touch by one, two or three or more fingers, the input control activated by the touch sensor may be dependent upon the number of fingers in engagement therewith, or maybe area dependent, that is to say the input control activated may depend upon the area of the touch sensor touched or engaged.

The touch sensitive regions may be raised or proud of surrounding regions of the outer case of the apparatus. The touch sensitive regions may comprise different texture or other tactile characteristic to that of the surrounding region of the outer case such that the user can sense or feel the input control. The touch sensing may be provided by a capacitive touch sensor, resistive touch sensor, another type of touch sensor, or any combination of the same.

Additionally, or alternatively, in some embodiments additional input controls 1111A, 1111B, 1111C, 1111D; 1211A, 1211B, 1211C, 1211D may be provide by one or more gesture sensitive pads or regions on the rear face R of the apparatus on a region of the housing between the handles H1, H2, the touch sensitive region may be provided on the inner walls of the handles H1, H2 or alternatively on both the rear face R and the inner walls of the handles H1, H2. In such embodiments, the gesture sensing may be provided by optical sensors or any other type of sensor for detecting gestures.

In some embodiments the microswitches may be replaced with a magnetic switch or sensor, for example a reed switch or hall sensor; the paddles may comprise a magnet arranged so as to activate the magnetic switch or sensor when the paddle is depressed by a user. It is envisaged that in such embodiments the magnetic switch or sensor is mounted inside the controller behind the back panel and that there will be no requirement to provide apertures through the back panel in order that the paddles can physically contact the microswitches. Further it is envisaged that the user may be provided with feedback to indicate that the switch has been activated. The feedback may be aural or haptic, for example, such as an audible click.

It is envisaged that the controllers may be coupled to a games console or computer by a wired connection or by a wireless connection device.

It is also envisaged that the controller may be constructed as a shell or caddy into which a hand-held electronic device such as, but not limited to, a mobile telephone (smartphone) or tablet computer is inserted, the caddy comprising control actuators, thumb sticks and/or buttons (which are coupled to the electronic device either wirelessly or via physical or wired connection) for interaction with or control of the electronic device.

It will be recognized that as used herein, directional references such as "top", "bottom", "front", "back", "end", "side", "inner", "outer", "upper" and "lower" do not limit the respective features to such orientation, but merely serve to distinguish these features from one another.

The invention claimed is:

1. An input apparatus for a computer comprising an outer case having a front face, a top face and opposing side walls, the apparatus comprising at least one control located on the top face of the apparatus, the apparatus being shaped to be held in both hands of a user such and the user's index fingers are positioned to operate the at least one control located on the top of the apparatus; the apparatus further comprises at least one additional control located on at least one of the opposing side walls of the apparatus in a position operable by an intermediate portion of the user's index finger.

2. An input apparatus according to claim 1 wherein at least one additional control comprises at least one switch mechanism disposed in an interior of the outer case.

3. An input apparatus according to claim 1 wherein at least one additional control is removable.

4. An input apparatus according to claim 1 wherein at least one additional control is mounted to a mounting base located in a position between an intermediate portion of the user's index finger and the outer case of the apparatus.

5. An input apparatus according to claim 1 wherein at least one additional control comprises a body portion wherein the body portion extends through an opening in the outer case.

6. An input apparatus according to claim 1 wherein at least one additional control comprises at least two switch mechanisms disposed in an interior of the outer case.

7. An input apparatus according to claim 1 wherein at least one additional control is pivotally mounted to the apparatus.

8. An input apparatus according to claim 1 wherein at least one additional control takes the form of a rocker switch.

9. An input apparatus according to claim 1 wherein at least one additional control takes the form of a toggle switch.

10. An input apparatus according to claim 1 wherein at least one additional control takes the form of a rotary switch.

11. An input apparatus according to claim 1 wherein the at least one additional control is integral with a panel forming the outer case of the apparatus.

12. An input apparatus according to claim 11 wherein a grip element is mounted to at least a portion of the at least one additional control.

13. An input apparatus according to claim 11 wherein the at least one additional control is defined in part by a cutaway in the panel.

14. An input apparatus according to claim 11 wherein the at least one additional control comprises a living hinge coupling the at least one additional control to the outer case.

15. An input apparatus according to claim 11 wherein a second panel forming part of the outer case comprises a cutaway in which at least a portion of the at least one additional control is received.

16. An input apparatus according to claim 1 wherein the input apparatus is a hand-held controller for a games console and further comprises:

a plurality of controls located on a front face and top face of the controller;

the controller being shaped to be held in both hands of a user such that the user's thumbs are positioned to operate controls located on the front of the controller and the user's index fingers are positioned to operate controls located on the top of the controller.

17. An input apparatus for a computer comprising an outer case having a front face, a top face and opposing side walls, the apparatus comprising at least one control located on the top face of the apparatus and at least one control located on the front face of the apparatus, the apparatus being shaped to be held in both hands of a user such and the user's index fingers are positioned to operate the at least one control located on the top of the apparatus and the user thumbs are positioned to operate the at least one control located on the front face of the apparatus; the apparatus further comprises at least one additional control located on at least one of the opposing side walls of the apparatus, a portion of the at least one additional control being mounted in a position between an intermediate portion of the user's index finger and the outer case of the apparatus.

18. An input apparatus according to claim 17 wherein at least one additional control comprises a contoured member extending about the side wall of the outer case.

19. An input apparatus according to claim 17 wherein at least one additional control comprises a contoured member extending about the side wall and at least one of the top, bottom or rear end of the apparatus.

* * * * *